(12) United States Patent
Kishimoto

(10) Patent No.: US 6,339,479 B1
(45) Date of Patent: Jan. 15, 2002

(54) VIDEO PROCESSING APPARATUS FOR PROCESSING PIXEL FOR GENERATING HIGH-PICTURE-QUALITY IMAGE, METHOD THEREOF, AND VIDEO PRINTER TO WHICH THEY ARE APPLIED

(75) Inventor: Masaki Kishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/975,411

(22) Filed: Nov. 20, 1997

(30) Foreign Application Priority Data

Nov. 22, 1996 (JP) .............................. 8-312297
Nov. 29, 1996 (JP) .............................. 8-320312
Nov. 29, 1996 (JP) .............................. 8-320313

(51) Int. Cl.$^7$ .................... G06K 15/02; G06T 3/40; G06T 5/00; G06T 5/20
(52) U.S. Cl. ................... 358/1.2; 358/1.9; 358/503; 382/261; 382/263; 382/264; 382/269; 382/300
(58) Field of Search ..................... 358/1.2, 1.9, 451; 382/260, 261, 263, 264, 266, 269, 275, 299, 300

(56) References Cited

U.S. PATENT DOCUMENTS

| | | | | |
|---|---|---|---|---|
| 5,054,100 A | * | 10/1991 | Tai | 382/300 |
| 5,357,353 A | * | 10/1994 | Hirota | 358/530 |
| 5,388,081 A | * | 2/1995 | Hashimoto et al. | 348/606 |
| 5,717,793 A | * | 2/1998 | Ushida et al. | 382/298 |
| 5,764,305 A | * | 6/1998 | Kondo | 348/571 |
| 5,825,434 A | * | 10/1998 | Yamazaki et al. | 348/625 |
| 5,844,627 A | * | 12/1998 | May et al. | 348/607 |

FOREIGN PATENT DOCUMENTS

EP  1054350 A1 * 11/2000 ............. G06T/3/40

\* cited by examiner

*Primary Examiner*—Scott Rogers
(74) *Attorney, Agent, or Firm*—Frommer Lawrence & Haug LLP; William S. Frommer

(57) ABSTRACT

A video processing apparatus according to the present invention includes edge detecting means for detecting an edge direction of an image, coefficient selecting means for selecting a coefficient based on the edge direction detected by the edge detecting means, and filter means for filtering a frequency band by using a frequency characteristic corresponding to the coefficient selected by the coefficient selecting means, wherein the number of pixels of the image is enlarged twice.

9 Claims, 26 Drawing Sheets

| | i → | |
|---|---|---|
| 0 | 0 | −1/32 |
| 0 | 0 | −3/32 |
| 0 | 0 | +5/16 |
| +5/16 | 0 | +5/16 |
| +5/16 | 0 | 0 |
| −3/32 | 0 | 0 |
| −1/32 | 0 | 0 |

↓ j $H_2(z_i, z_j)$:

| | | |
|---|---|---|
| 0 | 0 | −1/32 |
| 0 | 0 | −3/32 |
| 0 | 0 | +5/16 |
| 0 | +5/8 | 0 |
| +5/16 | 0 | 0 |
| −3/32 | 0 | 0 |
| −1/32 | 0 | 0 |

$H_3(z_i, z_j)$:

| | | |
|---|---|---|
| 0 | 0 | −1/32 |
| 0 | 0 | −3/32 |
| 0 | +5/32 | +5/32 |
| 0 | +5/8 | 0 |
| +5/32 | +5/32 | 0 |
| −3/32 | 0 | 0 |
| −1/32 | 0 | 0 |

$H_4(z_i, z_j)$:

| | | |
|---|---|---|
| 0 | −1/32 | 0 |
| 0 | −3/32 | 0 |
| 0 | +5/16 | 0 |
| 0 | +5/8 | 0 |
| 0 | +5/16 | 0 |
| 0 | −3/32 | 0 |
| 0 | −1/32 | 0 |

| -1/32 | 0 | 0 |
|---|---|---|
| -3/32 | 0 | 0 |
| +5/16 | 0 | 0 |
| +5/16 | 0 | +5/16 |
| 0 | 0 | +5/16 |
| 0 | 0 | -3/32 |
| 0 | 0 | -1/32 |

$H_6(z_i, z_j)$:

| -1/32 | 0 | 0 |
|---|---|---|
| -3/32 | 0 | 0 |
| +5/16 | 0 | 0 |
| 0 | +5/8 | 0 |
| 0 | 0 | +5/16 |
| 0 | 0 | -3/32 |
| 0 | 0 | -1/32 |

$H_7(z_i, z_j)$:

| -1/32 | 0 | 0 |
|---|---|---|
| -3/32 | 0 | 0 |
| +5/32 | +5/32 | 0 |
| 0 | +5/8 | 0 |
| 0 | +5/32 | +5/32 |
| 0 | 0 | -3/32 |
| 0 | 0 | -1/32 |

$H_8(z_i, z_j)$:

| 0 | -1/32 | 0 |
|---|---|---|
| 0 | -3/32 | 0 |
| 0 | +5/32 | 0 |
| +5/32 | +5/8 | +5/32 |
| 0 | +5/32 | 0 |
| 0 | -3/32 | 0 |
| 0 | -1/32 | 0 |

Input Video Data
X j

Insert Value of 0

Output of Double
Up-Sampling Circuit

Interpolation Filter H(z)

Output of
Interpolation Filter
(Double)

Output Video Data
Y j

Output of Multi-Stage
Interpolator (eight times)

FIG. 19

| |
|---|
| −1/8 |
| 0 |
| +5/8 |
| +1 |
| +5/8 |
| 0 |
| −1/8 |

| |
|---|
| −3/64 |
| −9/64 |
| +19/64 |
| +57/64 |
| +57/64 |
| +19/64 |
| −9/64 |
| −3/64 |

↓ j

VIDEO PROCESSING APPARATUS FOR PROCESSING PIXEL FOR GENERATING HIGH-PICTURE-QUALITY IMAGE, METHOD THEREOF, AND VIDEO PRINTER TO WHICH THEY ARE APPLIED

BACKGROUND OF THE INVENTION

1. Field of the Invention

The present invention relates to a video processing apparatus and a video processing method which are suitable for application to a pixel processing in a video printer, and a video printer.

2. Description of the Related Art

Recently, a sublimation type color printer has achieved higher definition. A main picture input to such color printer has a resolution which is as high as that of a video signal, and a picture having high resolution is not frequently employed as such input picture. Specifically, although the color printer can carry out a printing operation with high resolution, the resolution of the input image data is lower. Therefore, when the color printer carries out the printing operation with high resolution, the color printer must subjects the image data to a predetermined interpolation processing to convert it into an image which can be regarded as a high-resolution image data. However, since a picture quality of an output image after the printing operation considerably depends upon a method of interpolating an image data, an interpolating method which can provide a higher picture quality has been demanded.

Since the sublimation color printer can control resolution by changing gradation in a movement direction of a thermal head, i.e., a sub-scanning direction in an analog fashion, it is necessary to interpolate an image in a direction in which heating elements of the thermal head are arranged so that the printing operation of one line amount should be carried out, i.e., in a main scanning direction. Specifically, a processing for interpolating the image so that the number of the pixels in the main scanning direction should be doubled has been demanded. Such image interpolation method includes a simple enlargement method in which a pair of the same pixels are arranged to simply double the number of the pixels, a mean value interpolation method of employing a mean value of the pixels in the vertical direction as an interpolation pixel. Though the simple enlargement method, the mean value interpolation method and so on have mainly been employed as such image interpolation method, such image interpolation method also includes a pattern recognition mean-value interpolation method which is a high-level interpolation processing employing an information about neighbor pixels and which employs a mean value of pixels in an oblique direction as an interpolation pixel depending upon a pattern of a relationship in size among neighbor pixels.

A processing changing resolution of an image by changing the number of pixels in the main scanning direction at a desired scale factor has been demanded. Such image-resolution converting method includes an interpolatory calculation of a nearest neighbor method in which an input pixel closest to an output pixel position is employed as an output pixel, an internally-dividing-point interpolatory calculation method (by-linear method) of employing a weighted mean value of four input pixels at positions close to an output pixel position as an output pixel, and so on. Such image-resolution converting method also includes a three-dimensional convolution interpolatory calculation method (by-cubic method) of employing as an output pixel a value obtained by subjecting to a convolution sixteen input pixels close to an output pixel and a sinc function (sinx/x≈x3+x2+...).

The above image interpolation methods are involved in the following problems. Specifically, when the image interpolation method employs the simple enlargement method, since pixels at edges of an image are kept, the image is prevented from being blur but has a jaggy edge in the diagonal direction, which leads to a deteriorated picture quality of the image. When the mean value interpolation method is employed, since the mean value is employed as the interpolation pixel, the image is blurred and has a slight jaggy edge in the diagonal direction. When the pattern recognition mean value interpolation method is employed, the jaggy edge is corrected by interpolation so as to become smooth, but the mean value is employed as an interpolation pixel, the image is blurred. Further, when an artificial image such as a character or the like is printed, a line, of a character, curved at a corner at right angle is converted by interpolation into a diagonal ling and hence the character having such corner is deformed.

When the interpolatory calculation method employing the nearest neighbor method is employed, since the pixels at the edge of the image is kept, the image is prevented from being blurred, but the edge in the diagonal direction becomes jaggy, which leads to a deteriorated quality of an image. When the internally-dividing-point interpolatory calculation method is employed, since the mean value is employed as an interpolation pixel, the image is blurred and the edge thereof in the diagonal direction becomes slightly jaggy. When the three-dimensional convolution interpolatory calculation method is employed, it is possible to obtain an image having a high picture quality, but, if the method is realized in the form of a hardware, then a large number of multipliers are required, which leads to increase of the manufacturing costs of such hardware. Therefore, the interpolatory calculation method of the nearest neighbor method and the internally-dividing-point interpolatory calculation method have a problem of a picture quality, and the three-dimensional convolution interpolatory calculation method has a problem of its manufacturing cost.

Moreover, in order to process an image having high picture quality, the printer has carried out a sharpness processing for enhancing an image. If the hard sharpness processing is carried out, then a boundary of a color forming an image is made sharp to thereby enhance the whole image. Contrary, if the soft sharpness processing is carried out, then the whole image becomes soft in sharpness.

Such sharpness processing includes a processing employing a quadratic differential method. The quadratic differential method is a method which, when an image data is passed through an enhancement filter, employs a value obtained by subjecting an image data to a quadratic differential as an enhancement component. For example, coefficients of the enhancement filter are set to −0.25, 0.5 and −0.25 and then respectively allocated to sampling points of $Z-1, 0, Z+1$, and respective pixels of the image data are subjected to calculation by using these coefficients.

However, since, when a picture frequency $\omega=\pi$ is established, the enhancement filter employed in the above image enhancement method mainly enhances a frequency band of $\pi/2$ or higher, if the enhancement filter filters an image having a low frequency band, an image which has already been interpolated, and so on, only an aliasing component (aliasing signal) is enhanced and hence a high frequency band component inherent in the image is not enhanced much.

SUMMARY OF THE INVENTION

In view of such aspect, an image interpolating apparatus, it is a first object of the present invention is to provide an image interpolating method and a video printer which can prevent an image from being blurred and which can prevent a character and so on to be printed from being deformed.

It is a second object of the present invention is to provide an image resolution converting apparatus, an image resolution converting method and a video printer which can prevent an image from being blurred and which can convert a resolution of the image at a desired scale factor with a simple arrangement.

It is a third aspect of the present invention to provide a picture enhancement apparatus, a picture enhancement method and a video printer which can effectively enhance an image having a low frequency band.

According to a first aspect of the present invention, a video processing apparatus includes edge detecting means for detecting an edge direction of an image, coefficient selecting means for selecting a coefficient based on the edge direction detected by the edge detecting means, and filter means for filtering a frequency band by using a frequency characteristic corresponding to the coefficient selected by the coefficient selecting means, wherein the number of pixels of the image is enlarged twice.

According to a second aspect of the present invention, a video processing apparatus includes enlarging means for up-sampling video data to enlarge the number of data at a predetermined scale factor, decimating means for decimating the pixels by outputting the pixels of the enlarged video data at a desired ratio with employing an input the video data enlarged by the enlarging means. Resolution of the video data is converted at a desired scale factor.

According to a third aspect of the present invention, a picture enhancement apparatus includes first enhancement means for enhancing a first band which is a higher frequency band in a frequency band of an input video data, second enhancement means for enhancing a second band which is a lower frequency band in a frequency band thereof. A predetermined frequency band of the video data is enhanced by using the first enhancement means and the second enhancement means.

BRIEF DESCRIPTION OF THE DRAWINGS

FIG. 10 is a diagram showing coefficients of the two-dimensional adaptive filter according to the first embodiment;

FIG. 11 is a diagram showing coefficients of the two-dimensional adaptive filter according to the first embodiment;

FIGS. 18A to 18D are diagrams used to explain an operation of the re-sizing block according to the second embodiment, wherein FIG. 18A shows an input video data, FIG. 18B shows an output signal of a double up-sampling circuit, FIG. 18C shows an output signal from an interpolation filter, and FIG. 18D shows an output signal from a multi-stage interpolator and an output video data;

FIG. 19 is a diagram showing an example of coefficients of an interpolation filter H(Z) according to the second embodiment;

FIG. 21 is a diagram showing another example of coefficients of the interpolation filter H(Z) according to the second embodiment;

DESCRIPTION OF THE PREFERRED EMBODIMENTS

Figure 1:
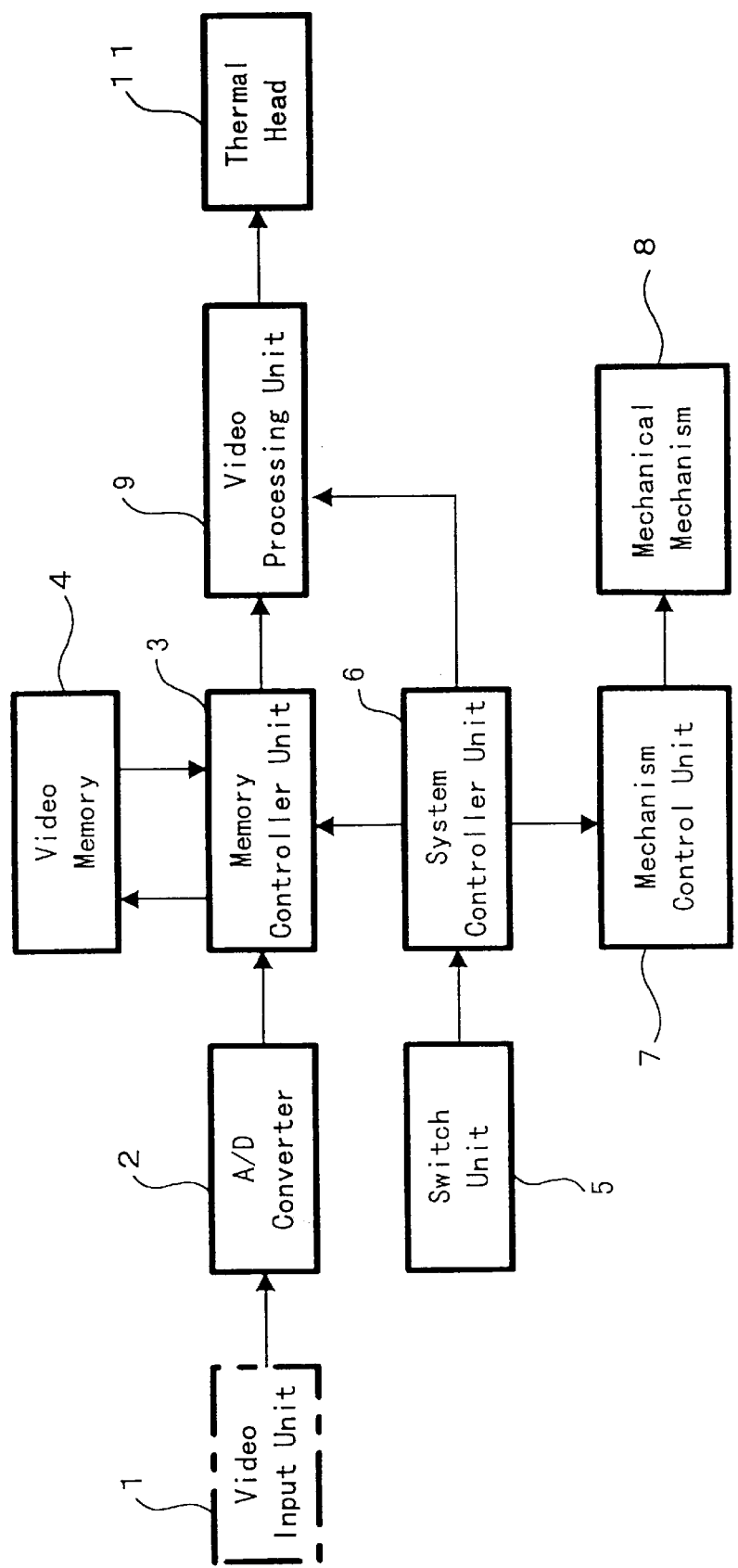
FIG. 1 is a block diagram showing an arrangement of a video printer to which the present invention is applied.

An image interpolating apparatus according to a first embodiment of the present invention will be described with reference to FIGS. 1 to 16. The image interpolating apparatus according to the embodiment simply doubles an area of a digital image and then detects local edge directions. The digital image is interpolated by a two-dimensional adaptive digital filter having such a directivity that a frequency component corresponding to a jaggy in the edge direction is cut, and the diagonal-direction edge is smoothly interpolated. Thus, a blur of the image is reduced, and it is possible to obtain an interpolated image having less deformation of a character or the like and higher picture quality.

A color video printer to which the image interpolating apparatus according to the embodiment is applied will be described with reference to FIG. 1. This color video printer has a video input unit 1 to which a video signal is input, an A/D converter 2 for quantizing an analog video signal input from the video input unit 1 to convert it into a digital signal, a video memory 4 serving as a frame memory for storing and keeping a data of a digital video signal of one frame amount, a memory controller unit 3 for controlling operations of writing and reading the digital video signal in and from the video memory 4, a switch unit 5 used for carrying out various setting operations, a system controller unit 6 for controlling an operation of a memory controller unit 3 based on the setting operations carried out by using switch unit 5, a mechanism control unit 7 for controlling an operation of a mechanical mechanism 8 under the control of the system controller unit 6, a mechanical mechanism 8 having a printing-paper feed motor or the like operated by the mechanism control unit 7, a video processing unit 9 for receiving the data of the digital video signal from the video memory 4 one line by one line in synchronization with a printing-paper feeding operation of the printing paper feed motor of the mechanical mechanism 8 and a thermal head 11 for printing the data of the digital video signal subjected to the image processing on the printing paper.

In particular, in the first embodiment, the video processing unit 9 has a non-linear interpolation block (not shown) for, after simply doubling an area of a digital image and then detects local edge directions, interpolating the digital image by using a two-dimensional adaptive digital filter having such a directivity that a frequency component corresponding to a jaggy in the edge direction is cut, to smoothly interpolate the diagonal-direction edge.

The color video printer having such arrangement is operated as follows. The video input unit 1 supplies an analog video signal to the A/D converter 2. The A/D converter 2 quantizes the analog video signal supplied from the video input unit 1, converts it into a digital signal, and supplies the digital signal to the memory controller unit 3. The memory controller unit 3 writes the data of the supplied digital video signal in the video memory 4 so that the data of the digital signal of one frame amount should be stored in the video memory 4.

Based on the various setting operation carried out by operating the switch unit 5, the system controller unit 6 controls the data writing and reading operations of the memory controller unit 3. When the system controller unit 6 issues a command to operate the mechanical mechanism 8 to the mechanism control unit 7, the mechanism control unit 7 controls the mechanical mechanism 8 formed of the printing-paper feed motor and the like. Then, the system controller unit 6 supplies a command to read out the data from the video memory 4 to the memory controller unit 3. In synchronization with the printing-paper feeding operation of the mechanical mechanism 8, the data of the digital video signal is read out from the video memory 4 one line by one line and supplied to the video processing unit 9. The video processing unit 9 subjects the supplied data of the digital video signal of one line amount to various video processings, and subjects the data to the thermal head 11. The thermal head 11 prints the data of the digital video signal on the printing paper with a generated heat corresponding to a gradation of the image data.

In particular, in the first embodiment, the non-linear interpolation block of the video processing unit 9 simply doubles an area of the digital image and then detects local edge direction. The non-linear interpolation block interpolates the digital image by using the two-dimensional adaptive digital filter having such a directivity that a frequency component corresponding to a jaggy in the edge direction is cut, and thereby smoothly interpolates the diagonal-direction edge.

A video processing unit will be described with reference to FIG. 2. The video processing unit shown in FIG. 2 corresponds to the video processing unit 9 shown in FIG. 9. The video processing unit has a register 12 for storing a control data Dc from the system controller unit 6 shown in FIG. 1, a main-scanning direction controller 13 for controlling a main scanning direction operation of the video processing unit based on the control data Dc and a data from the register 12, and a sub-scanning direction controller 14 for controlling a sub scanning direction operation of the video processing unit based on the control data Dc and the data from the register 12.

Figure 2:
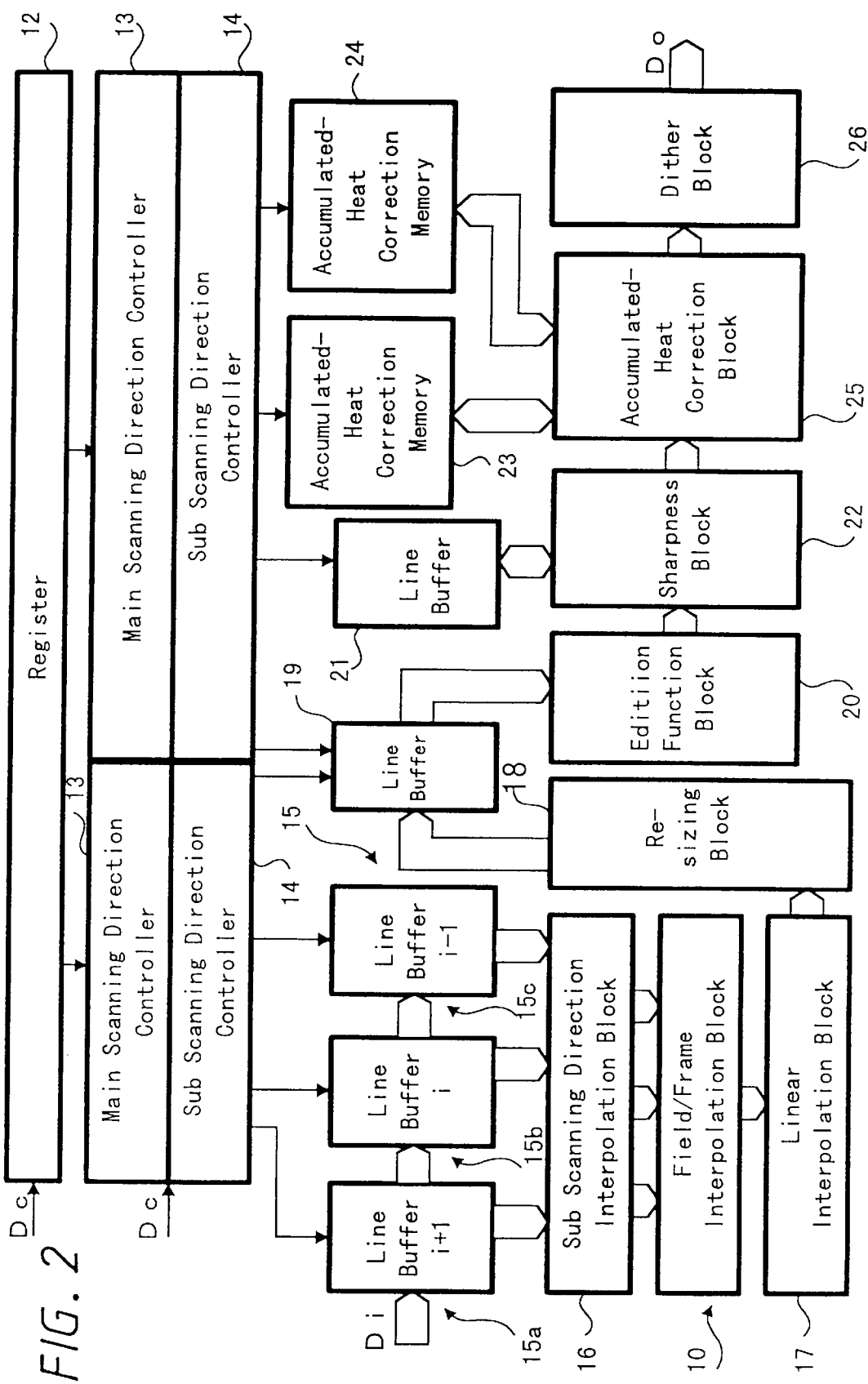
FIG. 2 is a block diagram of a video processing unit of the video printer shown in FIG. 1.

The video processing unit has line buffers 15a, 15b, 15c for successively and temporarily storing the input video data Di of one line amount supplied from the video memory 4 through the memory controller unit 3 shown in FIG. 1 one line by one line, a sub-scanning direction interpolation block 16 for interpolating the input video data Di of one line amount temporarily stored in the line buffers 15a, 15b, 15c in the sub-scanning direction, an d a linear interpolation block 17 for interpolating a field data. Particularly, in the first embodiment, the video processing unit shown in FIG. 2 has a field/frame interpolation block 10 (corresponding to the above-mentioned non-linear interpolation block) simply doubles the area of the image, detects the local edge direction, and then interpolates the image by using the two-dimensional adaptive digital filter having such directivity that a frequency component corresponding to a jaggy in the direction should be cut, thereby smoothly interpolating the image.

This video processing unit has a re-sizing block 18 for converting the number of scanning lines according to a pAL system into the number of scanning lines according to NTSC system, a line buffer 19 for temporarily storing the video data of one line amount having the scanning lines the converted number, an edition function block 20 for subjecting the video data to various edition functions, a line buffer 21 for temporarily holding the video data of one line amount used for sharpness correction, a sharpness block 22 for carrying out an enhancement processing, an accumulated-heat correction block 25 for correcting heat accumulated at the thermal head, an accumulated heat correction memory 23 for storing an accumulated-heat correction data o fa response system having a short time constant, an accumulated heat correction memory 24 for storing an accumulated-heat correction data of a response system having a long time constant, and a dither block 26 for adding to an original signal a noise (dither) corresponding to shading which is a difference relative to a constant threshold value used when the input signal is converted into a binary signal.

The video processing unit having the above arrangement is operated as follows. The control data Dc from the system controller unit 6 shown in FIG. 1 is supplied to the register 12, the main scanning direction controller 13 and the sub scanning direction controller 14. The control data Dc supplied to and stored in the register 12 is supplied to the main scanning direction controller 13 and the sub scanning direction controller 14. The main scanning direction controller 13 controls a main scanning direction operation of the video processing unit based on the control data Dc and the data from the register 12, and the sub scanning direction controller 14 controls a sub scanning direction operation of the video processing unit based on the control data Dc and the data from the register 12. Specifically, each of the main scanning direction controller 13 and the sub scanning direction controller 14 supplies a control signal to each of the line buffers 15a, 15b and 15c for the image interpolation processing, the line buffer 19 used for the re-sizing operation and the edition function, the line buffer 21 used for the enhancement processing, and the accumulated heat correction memories 23, 24 used for correcting the accumulated heat.

Figure 3:
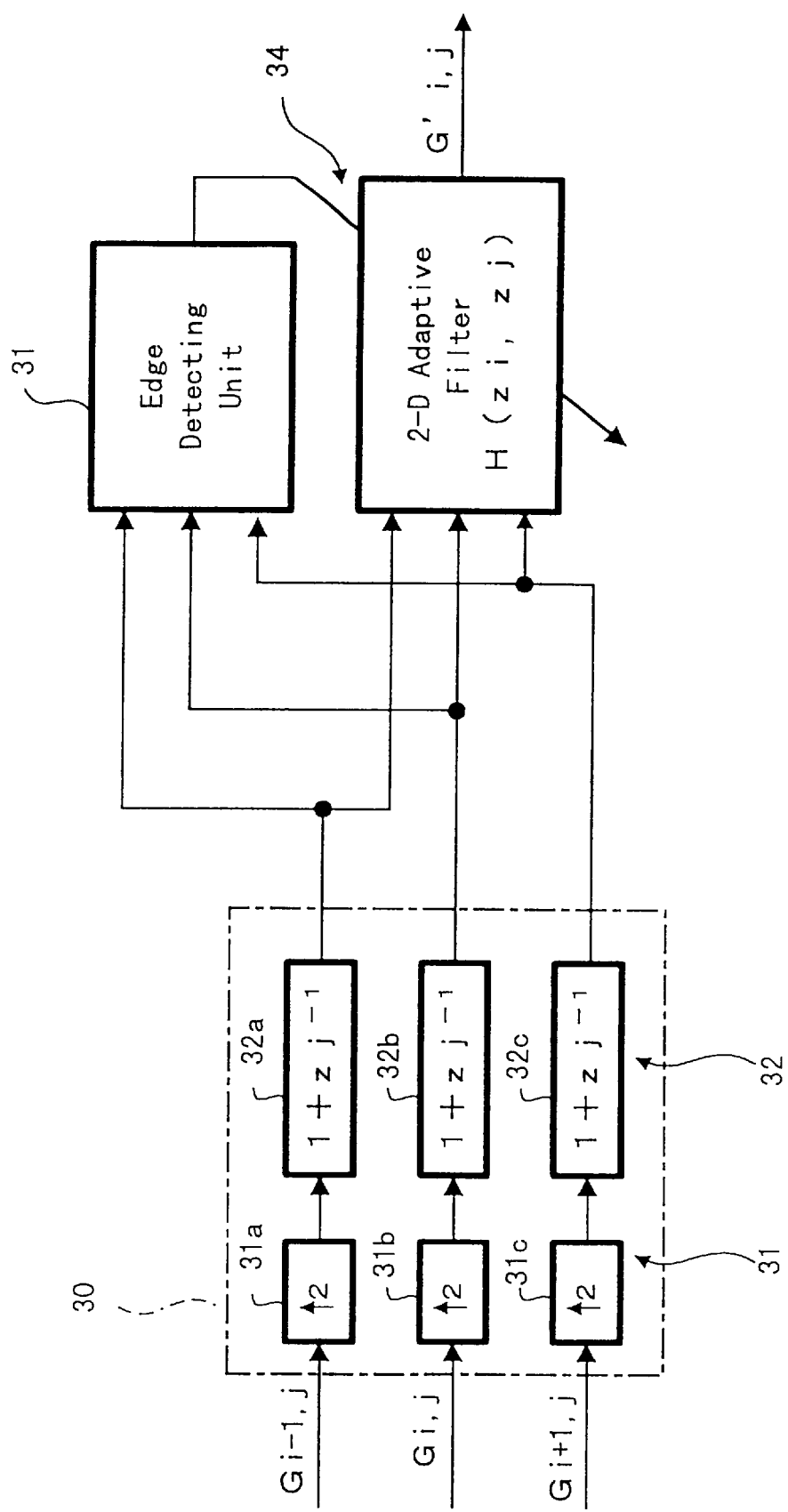
FIG. 3 is a block diagram showing an arrangement of a field/frame interpolation block according to a first embodiment of the present invention.

The input video data Di of one line amount is successively supplied from the video memory 4 through the memory controller unit 3 shown in FIG. 3 to the line buffers 15a, 15b, 15c. Specifically, the line buffer 15a temporarily holds a video data Di+1 of the line immediately succeeding the present line. The line buffer 15b temporarily holds a video data Di of the present line. The line buffer 15c temporarily holds a video data Di+1 of the line immediately preceding the present line. The input video data Di+1, Di, Di−1 respectively temporarily held by the line buffers 15a, 15b, 15c are supplied to the sub scanning direction interpolation block 16. The sub scanning direction interpolation block 16 interpolates the input video data Di+1, Di, Di−1 in the sub scanning direction. For example, the sub scanning direction interpolation block 16 interpolates a field data and rotates the image data at an angle of 90° so that two image data can be printed in the sub scanning direction, then interpolating the data in the sub scanning direction. The image data interpolated in the sub scanning direction or the image data which has not been interpolated in the sub scanning direction is supplied to the filed/frame interpolation block 10. When the video data is interpolated in the sub scanning direction, the filed/frame interpolation block 10 at the succeeding stage does not carry out the field/frame interpolation. However, only when the image data is not interpolated in the sub scanning direction and is supplied to the field/frame interpolation block 10 as it is, the field/frame interpolation block 10 carries out the field/frame interpolation. Thus, the processing in the field/frame interpolation block 10 is different depending upon whether or not the image data is interpolated in the sub scanning direction.

Particularly, in the first embodiment, the field/frame interpolation block 10 simply doubles areas of the images of a field data and a frame data of the video data which has not been interpolated in the sub scanning direction and detects the local edge direction. The field/frame interpolation block 10 interpolates the image by using the two-dimensional adaptive digital filter having such directivity that a frequency component corresponding to a jaggy in the direction, thereby interpolating the image so that the diagonal direction edge should be smooth. Specifically, the field/frame interpolation block 10 interpolates the field data or the frame data so that it should be doubled. The reason why the field/frame interpolation block 10 is referred to as a non-linear interpolation block is that the adaptive filter described later on is generally a non-linear filter. The image data having the field data and the frame data respectively doubled by interpolation is supplied to the linear interpolation block 17. The linear interpolation block 17 doubles, interpolation, not the frame data but only the field data. Specifically, the frame data is doubled by the non-linear interpolation but is not interpolated by the linear interpolation, consequently being doubled by interpolation. The field data is doubled by the non-linear interpolation and further doubled by the linear interpolation, consequently being increased four times. The reason whey the interpolation block 17 is referred to as the linear interpolation block is that the filter employed in the interpolation block 17 is a linear filter.

The video data thus interpolated is supplied to the re-sizing block 18. The re-sizing block 18 converts the number of scanning lines according to the PAL system into the number of scanning lines according to the NTSC system, for example, and then supplies the image data having the converted number of scanning lines to the line buffer 19. A processing time for writing and reading the image data of one line amount is required until the line buffer 19 is supplied with the image data of the present line after the input image data Di is input thereto. Specifically, the processings for writing the image data in the line buffer 15, the sub scanning direction interpolation block 16, the field/frame interpolation block 10, the linear interpolation block 17, the re-sizing block 18 and the line buffer 19 are carried out in synchronization with one another.

The video data of one line amount having the converted number of scanning lines by the re-sizing block 18 is read out from the line buffer 19 and then supplied therefrom to the edition function block 20. The edition function block 20 subjects the supplied data to various edition functions, and then supplies the video data subjected to various edition functions to the sharpness block 22. The sharpness block 22 carries out the enhancement processing. At this time, the line buffer 21 temporarily holds the video data of one line amount for sharpness correction. The video data corrected in sharpness is supplied from the sharpness block 22 to the accumulated heat correction block 25.

The accumulated heat correction block 25 corrects heat accumulated at the thermal head. At this time, an accumulated-heat correction data of a response system having a short time constant is supplied from the accumulated-heat correction memory 23 to the accumulation heat correction block 25, and an accumulated-heat correction data of a response system having a long time constant is supplied from the accumulated-heat correction memory 24 to the accumulation heat correction block 25. The two response systems are corrected by different processings.

The video data corrected in the accumulated heat is supplied to the dither block 26. The dither block 26 adds to an original signal a noise (dither) corresponding to shading which is a difference relative to a constant threshold value used when the input signal is converted into a binary signal. Thus, the dither block 26 outputs an output video data Do.

A processing time for writing and reading the image data of one line amount is required until the dither block 26 outputs the output video data Do after the video data is read out from the line buffer 19. Specifically, the processing for reading data from the line buffer 19 and the processings of the edition function block 20, the sharpness block 22, the accumulated heat correction block 25 and the dither block 26 are carried out in synchronization with one another.

Specific arrangement and operation of the image interpolating apparatus according to the first embodiment will be described. FIG. 3 is a diagram showing an arrangement of the field/frame interpolation block 10. As shown in FIG. 3, the field/frame interpolation block 10 has a simple enlarging unit 30 for simply enlarging an image twice, an edge detecting unit for detecting a local edge direction of the image, and a two-dimensional (2-D) adaptive digital filter 34 having such directivity that a frequency component corresponding to a jaggy in the edge detection direction is cut,. In FIG. 3, $G_{i,j}$ and $G'_{i,j}$ represent digital video data, and i and j respectively represent the sub scanning direction (line increment) and the main scanning direction (line direction).

Figure 4:
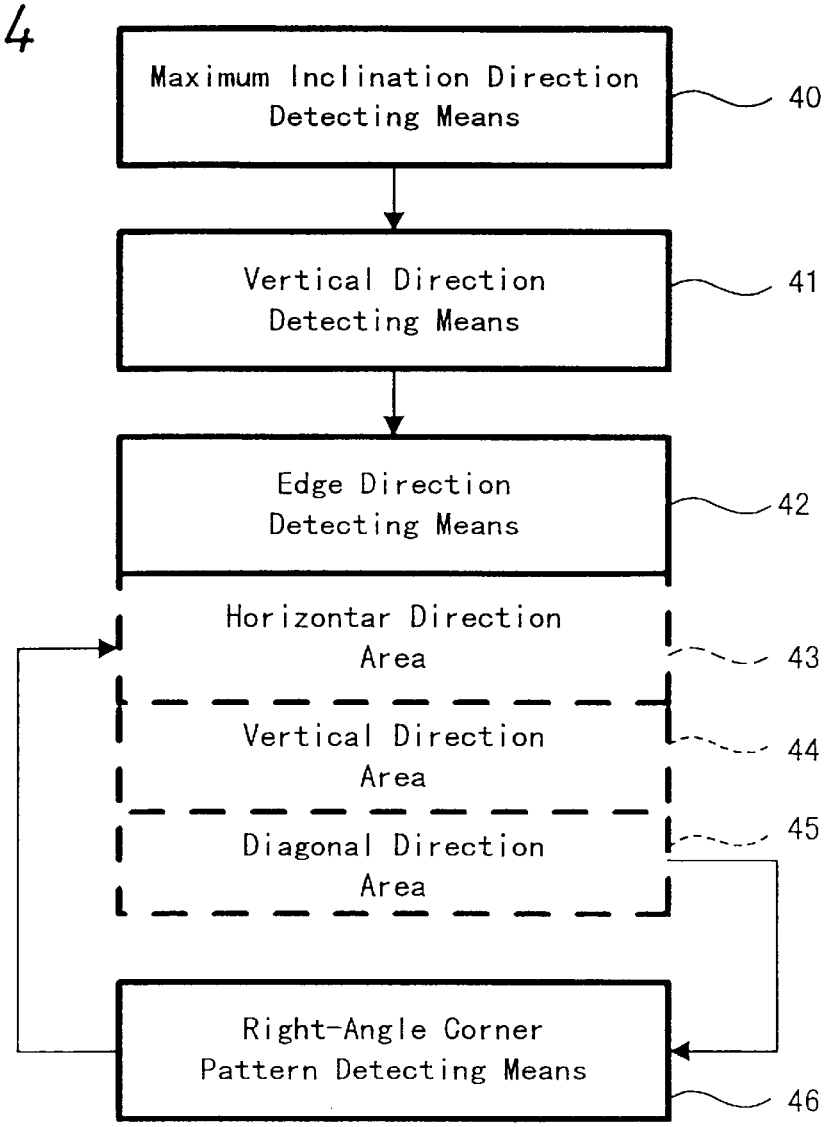
FIG. 4 is a diagram showing a function block of an edge detecting unit according to the first embodiment.

The simple enlarging unit 30 has a double up-sampling circuit 31 and a 0th-order holding circuit 32. The double up-sampling circuit 31 has a double up-sampling circuit 31a for subjecting a digital video data $G_{i-1, j}$ to double up-sampling processing, a double up-sampling circuit 31b for subjecting a digital video data $G_{i, j}$ to double up-sampling processing, and a double up-sampling circuit 31c for subjecting a digital video data $G_{i+1, j}$ to double up-sampling processing. The 0th holding circuit 32 has a 0th holding circuit 32a for adding the digital video data $G_{i-1, j}$ subjected to double up-sampling processing with a data at one previous sampling point, a 0th holding circuit 32b for adding the digital video data $G_{i, j}$ subjected to a double up-sampling processing with a data at one previous sampling point, and a 0th holding circuit 32a for adding the digital video data $G_{i+, j}$ subjected to double up-sampling processing with a data at one previous sampling point FIG. 4 is a diagram showing a function block of a edge detecting unit 33. The function block shown in FIG. 4 corresponds to the edge detection unit 33 shown in FIG. 3. The edge detection unit 33 has a maximum inclination detecting means 40 for a local maximum inclination of the image, a vertical direction detecting means 41 for detecting a vertical direction relative to the direction of the maximum inclination as the edge direction, an edge direction area designating means 42 for dividing the detected edge direction at least into predetermined horizontal-direction, vertical-direction and diagonal-direction areas 43, 44, 45 in the to designate an edge direction area, and a right-angle corner pattern detecting means 46 for detecting a right-angle corner pattern of a character and the like.

Figure 5:
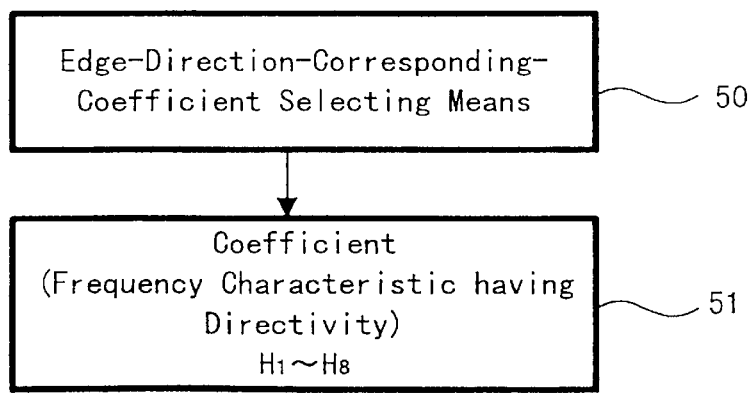
FIG. 5 is a diagram showing a function block of a two-dimensional adaptive filter according to the first embodiment.

FIG. 5 is a diagram showing a function block of a two-dimensional adaptive digital filter. The function block shown in FIG. 5 corresponds to the two-dimensional adaptive digital filter 34 shown in FIG. 3. The two-dimensional adaptive filter has an edge-direction-corresponding-coefficient selecting means 50 and coefficients 51 ($H_1$ to $H_8$) having frequency characteristics having directivity.

The operation of the filed/frame interpolation block 10 having the above arrangement will hereinafter be described.

An operation of the simple enlarging unit 30 will be described. The double up-sampling circuit 31a subjects the digital video data $G_{i-1, j}$ to the double up-sampling processing. The double up-sampling circuit 31b subjects the digital video data $G_{i, j}$ to the double up-sampling processing. The double up-sampling circuit 31c subjects the digital video data $G_{i+1, j}$ to the double up-sampling processing. Then, each of the double up-sampling circuits 31a, 31b, 31c output a value at an original sampling point and a value of 0 at a point of the double up-sampling processing.

The values at the original sampling points and the values of 0 at the point of the double up-sampling processings which are supplied from the double up-sampling circuits 31a, 31b, 31c are supplied to the 0th holding circuits 32a, 32b, 32c, respectively. Each of the 0th holding circuits 32a, 32b, 32c adds the supplied value at the original sampling point and the supplied value at the one previous sampling point upon the double up-sampling processing. Thus, the video data enlarged twice in the main scanning direction can be obtained from the simple enlarging unit 30.

An operation of the edge detecting unit will be described. The maximum inclination direction detecting means 40 detects the local maximum direction of the image. The vertical-direction detecting means 41 detects the vertical direction perpendicular to the maximum inclination direction as the edge direction. A method of detecting an edge based on the local inclination information will hereinafter be described. In general, assuming that a smooth analog image is represented by a function f(x,y), then calculation using spatial linear differential permits a local maximum inclination direction thereof to be expressed by vector of equation (1).

$$\mathrm{grad}\ f(x,y) = (\partial f(x,y)/\partial x, \partial y(x,y)/\partial y) \qquad (1)$$

A direction perpendicular to the vector expressed in the equation (1) corresponds to the edge direction. Similarly, assuming that the digital data is $G_{i, j}$, a local maximum inclination direction thereof can generally be expressed by vector (pi,j, qi,j) of equation (2).

$$(\mathrm{pi},\mathrm{j},\ \mathrm{qi},\mathrm{j}) = (G_{i+1,j} - G_{i,j},\ G_{i,j+1} - G_{i,j}) \qquad (2)$$

If a local maximum direction of a larger area is calculated in order to match phases, then the local maximum direction can be expressed by vector of equation (3)

$$(\mathrm{pi},\mathrm{j},\ \mathrm{qi},\mathrm{j}) = ((G_{i+1,j-1} + G_{i+1,j} + G_{i+1,j+1})$$

$$-(G_{i-1,j-1} + G_{i-1,j}$$

$$+G_{i-1,j+1})), ((G_{i+1,j-1} + G_{i+1,j} + G_{i+1,}$$

$$_{j+1}) - (G_{i,j-1} + G_{i,j} + G_{i,j+1})) \qquad (3)$$

Figure 6:
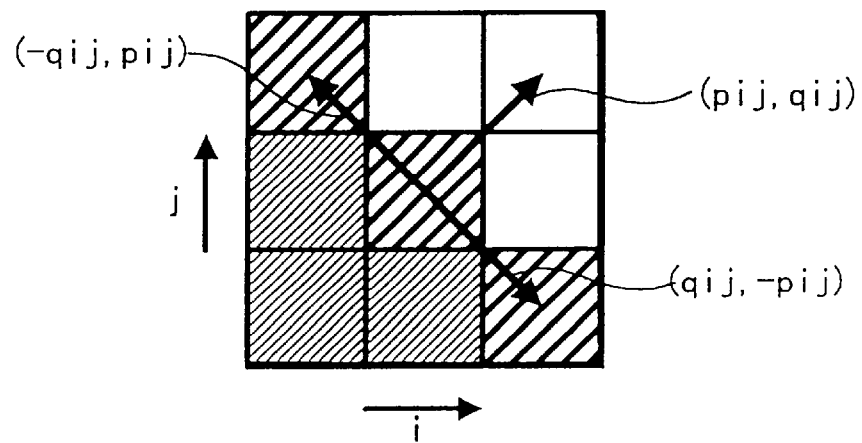
FIG. 6 is a diagram showing an inclination vector of an image according to the first embodiment.

The vector perpendicular to the vector (pi,j, qi,j) is calculated as shown in FIG. 6. Specifically, in an image block formed of 3 pixels×3 pixels surrounding a pixel to be interpolated, a value of an image data of each of pixels shown by dense hatchings is zero, a value of an image data of pixels shown by thin hatchings is a middle value, and a value of an image data of each of pixels shown by blank is a maximum value. at this time, the vector (pi,j, qi,j) represents a direction from a pixel having an image data value of zero or a middle value of an image data to a pixel having a maximum value. In this case, as shown in FIG. 6, three pixels around a lower left corner of the image block have a value of zero, three pixels on a line from an upper left corner to a lower right corner including the pixel to be interpolated have a value of a middle value, and three pixels around an upper right corner thereof have a maximum value. Therefore, the vector of the pixel to be interpolated is in the diagonal and upward direction inclined toward the right. The vector perpendicular to the vector is a vector (−qi,j,pi,j) or a vector (qi,j, −pi,j) in the direction of the three pixels on a line from an upper left corner to a lower right corner including the pixel to be interpolated. The vector (−qi,j,pi,j) or the vector (qi,j, −pi,j) corresponds to the edge direction.

Figure 7:
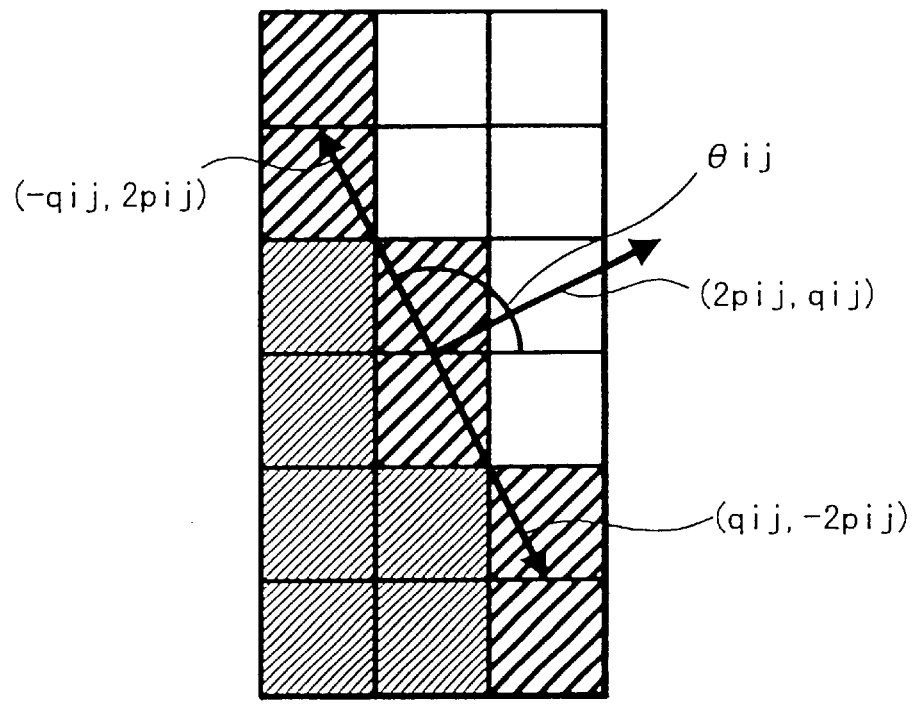
FIG. 7 is a diagram showing an inclination vector of an interpolated image according to the first embodiment.

If the simple enlarging unit 30 enlarges the image twice in the main scanning direction j (line direction), then the vector (pi,j, qi,j) becomes a vector (2pi,j, qi,j) and a vector perpendicular to the vector (2pi,j,qi,j) can be calculated as shown in FIG. 7. Specifically, in an image block of 3 pixels×6 pixels which is enlarged twice in the main scanning direction j and which includes the pixel to be interpolated, pixels shown by dense hatchings has an image data value of zero, pixels shown by thin hatchings has a mean image data value, and pixels shown by blank has a maximum image data value. At this time, the respective pixels shown in FIG. 6 are enlarged twice in the main scanning direction j. The vector (2pi,j, qi,j) represents a direction from a pixel having an image data value of zero or the middle value to the pixel having the maximum value. In this case, as shown in FIG. 7, six pixels around a lower left corner of the image block have a value of zero, six pixels on a line from an upper left corner to a lower right corner including the pixel to be interpolated, which has been enlarged twice, have a value of a middle value, and six pixels around an upper right corner thereof have a maximum value. Therefore, the vector of the pixel to be interpolated is in the diagonal and upward direction inclined toward the right. The vector perpendicular to the vector is a vector (−qi,j,2pi,j) or a vector (qi,j, −2pi,j) in the direction of the three pixels on a line from an upper left corner to a lower right corner including the pixel which has been enlarged twice and is to be interpolated. The vector (−qi,j,2pi,j) or the vector (qi,j,−2pi,j) corresponds to the edge direction. If this vector is expressed by using an inclination ai, j of a straight line in this direction, it can be expressed by equation (4).

$$a_{i,j} = \tan\theta_{i,j} = -2p_{i,j}/q_{i,j} \tag{4}$$

The local edge direction of the image can be expressed with the value of ai,j.

An operation of detecting such edge direction will be described in detail. Assuming that an image data obtained by enlarging the image data Gi, j twice in the main scanning direction j is gi,k, then the image data gi,k can be expressed by the following equation (5).

$$g_{i,k} = G_{i,k/2}\text{(if k is an even number)} = G_{i,(k-1)/2}\text{ (if k is an odd number)} \tag{5}$$

An amount corresponding to the spatial linear differential (pi,j, qi,j) described above can be obtained by the following equation (6) with using the video data gi,k which has been enlarged twice.

$$(r_{i,k}, S_{i,k}) = (\max[(g_{i+1,k}+g_{i+1,k-2}-g_{i,k}-g_{i,k-2})/2, (g_{i,k}+g_{i,k-2}$$

$$-g_{i-1,k}-g_{i-1,k-2})/2], (g_{i+1,k}+g_{i,k}+g_{i-1,k}-g_{i+1,k-2}-g_{i,k-2}-g_{i-1,k-2})/3$$
(k:even)

$$=(\max[(g_{i+1,k}+g_{i+1,k+2}-g_{i,k}-g_{i,k+2})/2, (g_{i,k}+g_{i,k+2}-g_{i-1,k}-g_{i-1,k+2})/2],$$

$$(g_{i+1,k+2}+g_{i,k+2}+g_{i-1,k+2}-g_{i+1,k}-g_{i,k}-g_{i-1,k})/3 \text{ (k:odd)} \tag{6}$$

where max [*.*] represents one having a larger absolute value. As described above, it can be understood that the amount (ri,k, si,k) is obtained in consideration of a phase of the twice-enlarged image.

Further, a quadratic differential value in the directions i and k is calculated. If the absolute value of the calculated value is small, then it is determined that a curve at a curved portion of the image is not sharp and then the following equation (7) is employed.

$$(r_{i,k}, S_{i,k}) = ((g_{i+1,k}+g_{i+1,k-2}-g_{i-1,k}-g_{i,k-2})/2,$$

$$(g_{i+1,k+2}+g_{i,k+2}-g_{i-1,k+2}-g_{i+1,k-2}-g_{i,k-2}-g_{i-1,k-2})/3 \text{ (k:even)}$$

$$=((g_{i+1,k}+g_{i+1,k-2}-g_{i-1,k}-g_{i,k-2})/2, (g_{i+1,k+2}+g_{i,k+2}$$

$$-g_{i-1,k+2}-g_{i+1,k-2}-g_{i,k-2}-g_{i-1,k-2})/3 \text{ (k:odd)} \tag{7}$$

As described above, when the quadratic differential value in the directions i and k is small, the inclination vector is calculated by using the data of a larger area, and hence it is possible to prevent misdetection. An amount corresponding to the inclination ai,j which expresses the local edge direction of the image by equation (4) can be expressed as an inclination bi,k by the following equation (8)., $$b_{i,k} = -2r_{i,k}/s_{i,k} \tag{8}$$

Figure 8:
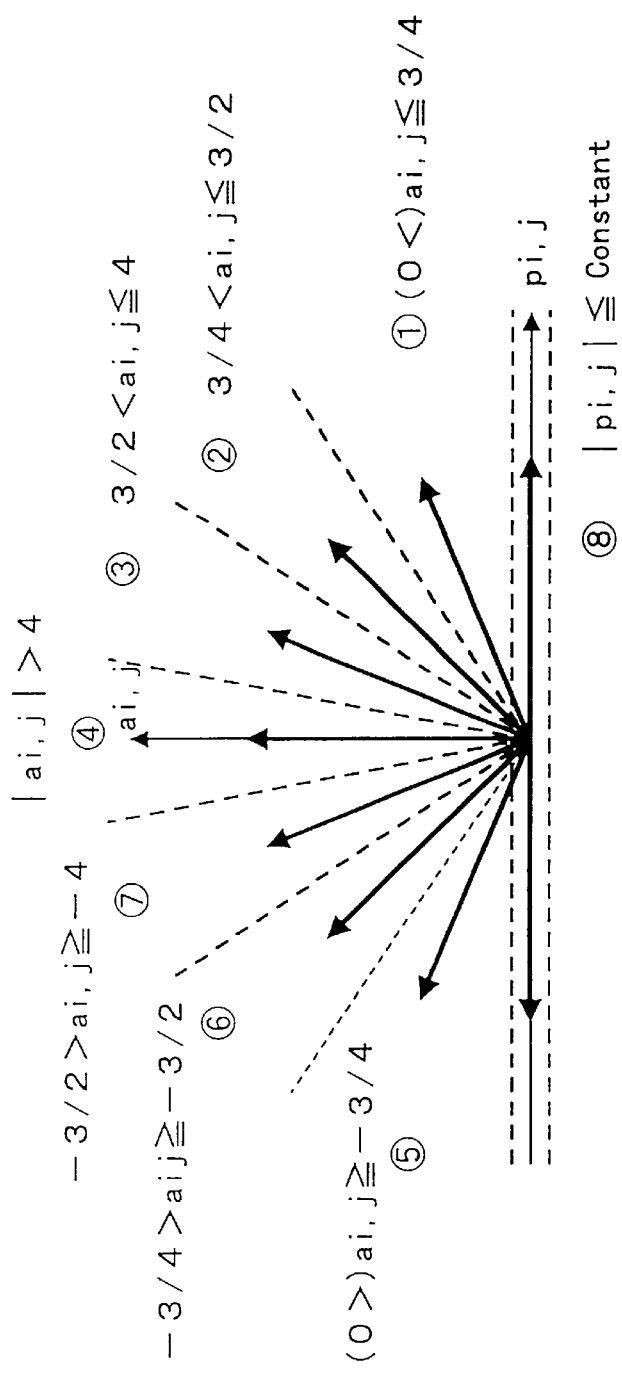
FIG. 8 is a diagram showing areas of an edge direction of the image according to the first embodiment.

Using the value of the inclination bi,k thus obtained, the edge direction area designating means 42 divides the edge direction of the image into eight areas shown in FIG. 8 including at least the horizontal direction area 43, the vertical direction area 44 and the diagonal direction area 45. FIG. 8 shows an example of dividing the edge direction into eight areas similarly to division of the edge direction with the value of the calculated inclination ai,j. An area $\hat{1}$ is selected when the value of the inclination ai,j is positive and equal to or smaller than 3/4. An area $\hat{2}$ is selected when the value of the inclination ai,j is larger than 3/4 and equal to or smaller than 3/2. An area $\hat{3}$ is selected when the value of the inclination ai,j is larger than 3/2 and equal to or smaller than 4. An area $\hat{4}$ is selected when the value of the inclination ai,j is larger than 4. An area $\hat{5}$ is selected when the value of the inclination ai,j is negative and equal to or larger than −3/4. An area $\hat{6}$ is selected when the value of the inclination ai,j is smaller than −3/4 and equal to or larger than −3/2. An area $\hat{7}$ is selected when the value of the inclination ai,j is smaller than −3/2 and equal to or larger than −4. An area $\hat{8}$ is selected when the absolute value of pi,j is equal to or smaller than a constant. Specifically, the area $\hat{8}$ is the horizontal direction area 43, the area $\hat{4}$ is the vertical direction area 44. The areas $\hat{1}$ to $\hat{3}$ and $\hat{5}$ to $\hat{7}$ belong to the diagonal direction area 45.

Figure 9:
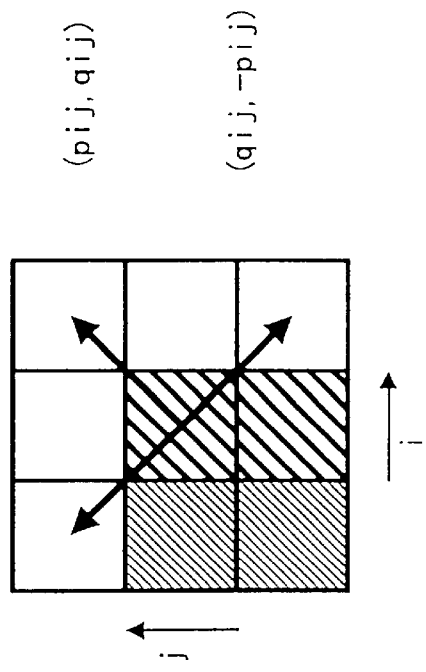
FIG. 9 is a diagram showing a right-angle corner pattern according to the first embodiment.

If the edge direction designating means 42 detects the diagonal direction area 45 such as the areas $\hat{1}$ to $\hat{3}$ and $\hat{5}$ to $\hat{7}$ shown in FIG. 8, the right-angle-corner detecting means 46 detects a right-angle-corner pattern of a character or the like shown in FIG. 9. In FIG. 9, in an image block formed of 3 pixels ×3 pixels surrounding the pixel to be interpolated, each of pixels shown by dense hatchings has an image data value of zero, each of pixels shown by thin hatchings has a middle image data value, and pixels shown by bland has a maximum value. At this time, the vector (pi,j, qi,j) represents a direction from the pixels having an image value of zero or a middle value to the pixels having a maximum value. In this case, as shown in FIG. 9, since two pixels at the middle and lowermost positions of the left side have values of zero, two pixels including the pixel to be interpolated have middle values, and five pixels at the upper row and the right column have maximum values, a vector of the pixel to be interpolated is detected as the upward and diagonal direction inclined toward the right. Then, a vector perpendicular to the vector is detected as one of a vector (−qi,j, pi,j) and a vector (qi,j, pi,j) which are respectively an upward and diagonal direction inclining to the left and a downward and diagonal direction inclining to the right, regardless of the fact that the pixels having the middle values including the pixel to be interpolated is in the direction j. The vector (−qi,j, pi,j) or the vector (qi,j, pi,j) corresponds to the edge direction.

However, since the right-angle-corner pattern shown in FIG. 9 is included not in natural images but in artificial images such as an image of a character or the like. As shown in FIG. 9, if the direction of the vector (−qi,j, pi,j) or the vector (qi,j, pi,j) is detected as the edge direction as shown in FIG. 9, then a shape of the character is deformed. Therefore, in order to detect the right-angle-corner pattern, inclinations of surrounding pixels are also calculated in accordance of the following equation (9). This calculation is carried out when the diagonal-direction area 45 including areas $\hat{5}$ to $\hat{7}$ is selected.

$$dm_{i,j} = g_{i+2,k} - g_{i+2,k-2}$$
$$dn_{i,k} = g_{i,k+2} - g_{i-2,k-2}$$
$$dh1_{i,j} = g_{i,k} - g_{i+2,k}$$
$$dh2_{i,j} = g_{i,k-2} - g_{i+2,k-2} \quad (9)$$

At this time, if absolute values of $dm_{i,k}$ and $dn_{i,k}$ are small and $dh1_{i,k}$ and $dh2_{i,k}$ have the same plus sign, then it is determined that the right-angle-corner pattern is detected, and the horizontal direction area 43 of the area 8 shown in FIG. 8 is selected. In other cases, the similar processings are carried out. This processing for detecting the right-angle corner can suppress the deformation of the artificial image such as the character or the like. Thus, the local edge direction of the image is detected.

An operation of the two-dimensional adaptive filter will be described. Depending upon the edge directions of the areas $\hat{1}$ to $\hat{8}$ shown in FIG. 8 detected by the edge detecting unit 33, the edge-direction-corresponding-coefficient selecting means 50 of the two-dimensional adaptive filter switches the coefficients 51 to one of coefficients $H_1((Zi, Zj)$ to $H_8(Zi, Zj)$ shown in FIGS. 10 and 11. In FIG. 10, the coefficient $H_1(Zi, Zj)$ has values of 0, 0, 0, +5/16, +5/16, −3/32, −1/32 in the main scanning direction j relative to a first line of the sub scanning direction i, values of 0, 0, 0, 0, 0, 0, 0 in the main scanning direction j relative to a second line of the sub scanning direction i, values of −1/32, −3/32, +5/16, +5/16, 0, 0, 0 in the main scanning direction j relative to a third line of the sub scanning direction i. The coefficient $H_2(Zi, Zj)$ has values of 0, 0, 0, 0, +5/16, −3/32, −1/32 in the main scanning direction j relative to the first line of the sub scanning direction i, values of 0, 0, 0, +5/8, 0, 0, 0 in the main scanning direction j relative to the second line of the sub scanning direction i, values of −1/32, 3/32, +5/16, 0, 0, 0, 0in the main scanning direction j relative to the third line of the sub scanning direction i. The coefficient $H_3(Zi, Zj)$ has values of 0, 0, 0, 0, +5/32, −3/32, −1/32 in the main scanning direction j relative to the first line of the sub scanning direction i, values of 0, 0, +5/32, +5/8, +5/32, 0, 0 in the main scanning direction j relative to the second line of the sub scanning direction i, values of −1/32, −3/32, +5/32, 0, 0, 0, 0 in the main scanning direction j relative to the third line of the sub scanning direction i. The coefficient $H_4(Zi, Zj)$ has values of 0, 0, 0, 0, 0, 0, 0 in the main scanning direction j relative to the first line of the sub scanning direction i, values of −1/32, −3/32, +5/32, +5/8, +5/32, −3/32, −1/32 in the main scanning direction j relative to the second line of the sub scanning direction i, values of 0, 0, 0, 0, 0, 0, 0 in the main scanning direction j relative to the third line of the sub scanning direction i.

In FIG. 11, the coefficient $H_5(Zi, Zj)$ has values of −1/32, −3/32, +5/16, +5/16, 0, 0, 0 in the main scanning direction j relative to the first line of the sub scanning direction i, values of 0, 0, 0, 0, 0, 0, 0 in the main scanning direction j relative to the second line of the sub scanning direction i, values of 0, 0, 0, +5/16, +5/16, −3/32, −1/32 in the main scanning direction j relative to the third line of the sub scanning direction i. The coefficient $H_6(Zi, Zj)$ has values of −1/32, −3/32, +5/16, 0, 0, 0, 0 in the main scanning direction j relative to the first line of the sub scanning direction i, values of 0, 0, 0, +5/8, 0, 0, 0 in the main scanning direction j relative to the second line of the sub scanning direction i, values of 0, 0, 0, 0, +5/16, −3/32, −1/32 in the main scanning direction j relative to the third line of the sub scanning direction i. The coefficient $H_7(Zi, Zj)$ has values of −1/32, −3/32, +5/32, 0, 0, 0, 0 in the main scanning direction j relative to the first line of the sub scanning direction i, values of 0, 0, +5/32, +5/8, +5/32, 0, 0 in the main scanning direction j relative to the second line of the sub scanning direction i, values of 0, 0, +5/32, +5/8, +5/32, 0, 0 in the main scanning direction j relative to the second line of the sub scanning direction i, values of 0, 0, 0, 0, +5/32, −3/32, −1/32 in the main scanning direction j relative to the third line of the sub scanning direction i. The coefficient $H_8(Zi, Zj)$ has values of 0, 0, 0, +5/32, 0, 0, 0 in the main scanning direction j relative to the first line of the sub scanning direction i, values of −1/32, −3/32, +5/32, +5/8, +5/32, −3/32, −1/32 in the main scanning direction j relative to the second line of the sub scanning direction i, values of 0, 0, 0, +5/32, 0, 0, 0 in the main scanning direction j relative to the third line of the sub scanning direction i.

Since the respective filtering operations using these coefficients are carried out in the main scanning direction j, it is sufficient to incorporate a video memory for about three lines. Since the filter coefficient is a multiple of 2, it is possible to provide these filtering operation in the form of a hardware with a comparative inexpensive cost.

Figure 12:
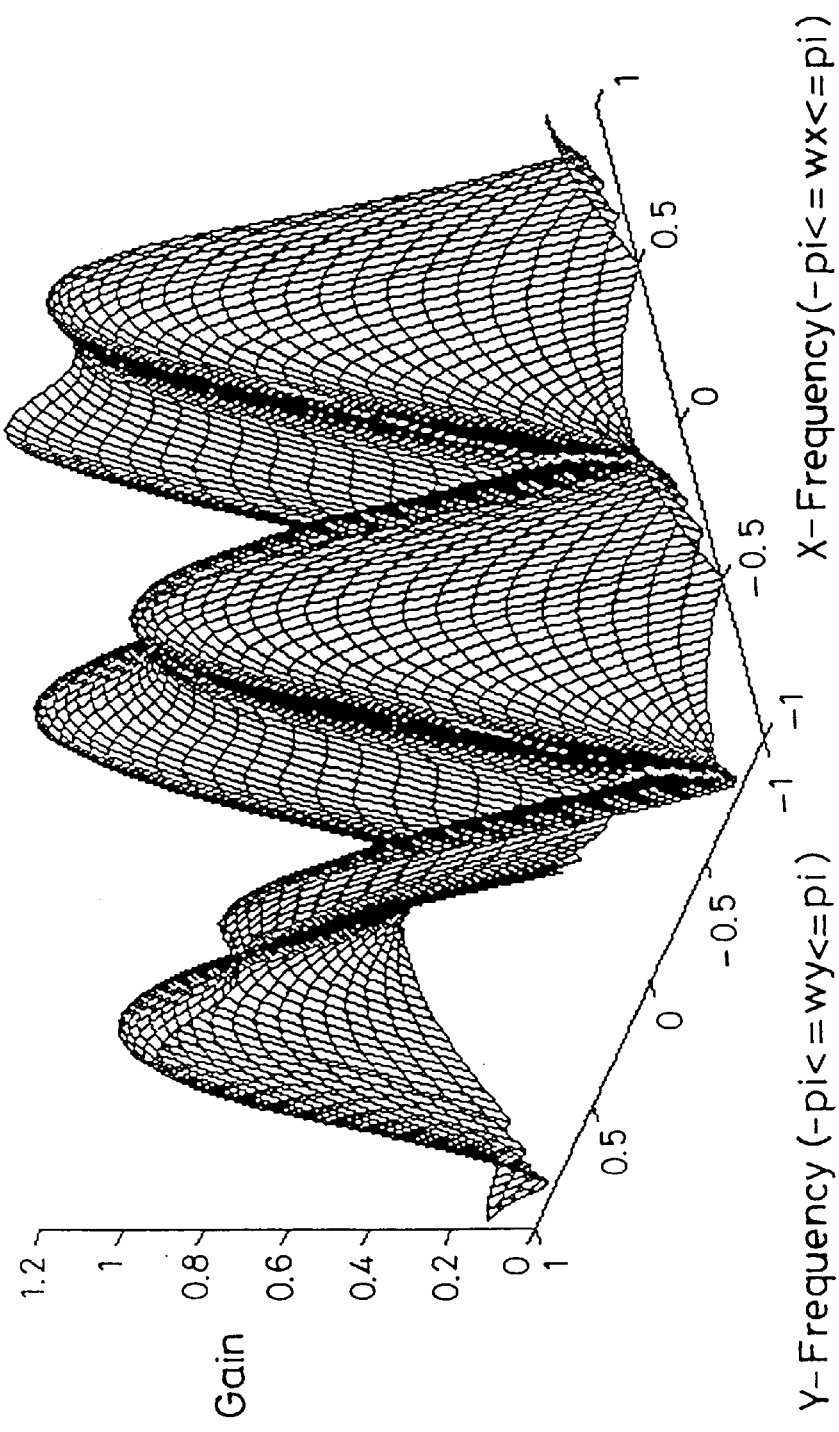
FIG. 12 is a graph showing a frequency characteristic of a coefficient $H_5(Z_i, Z_j))$ according to the present invention.
Figure 13:
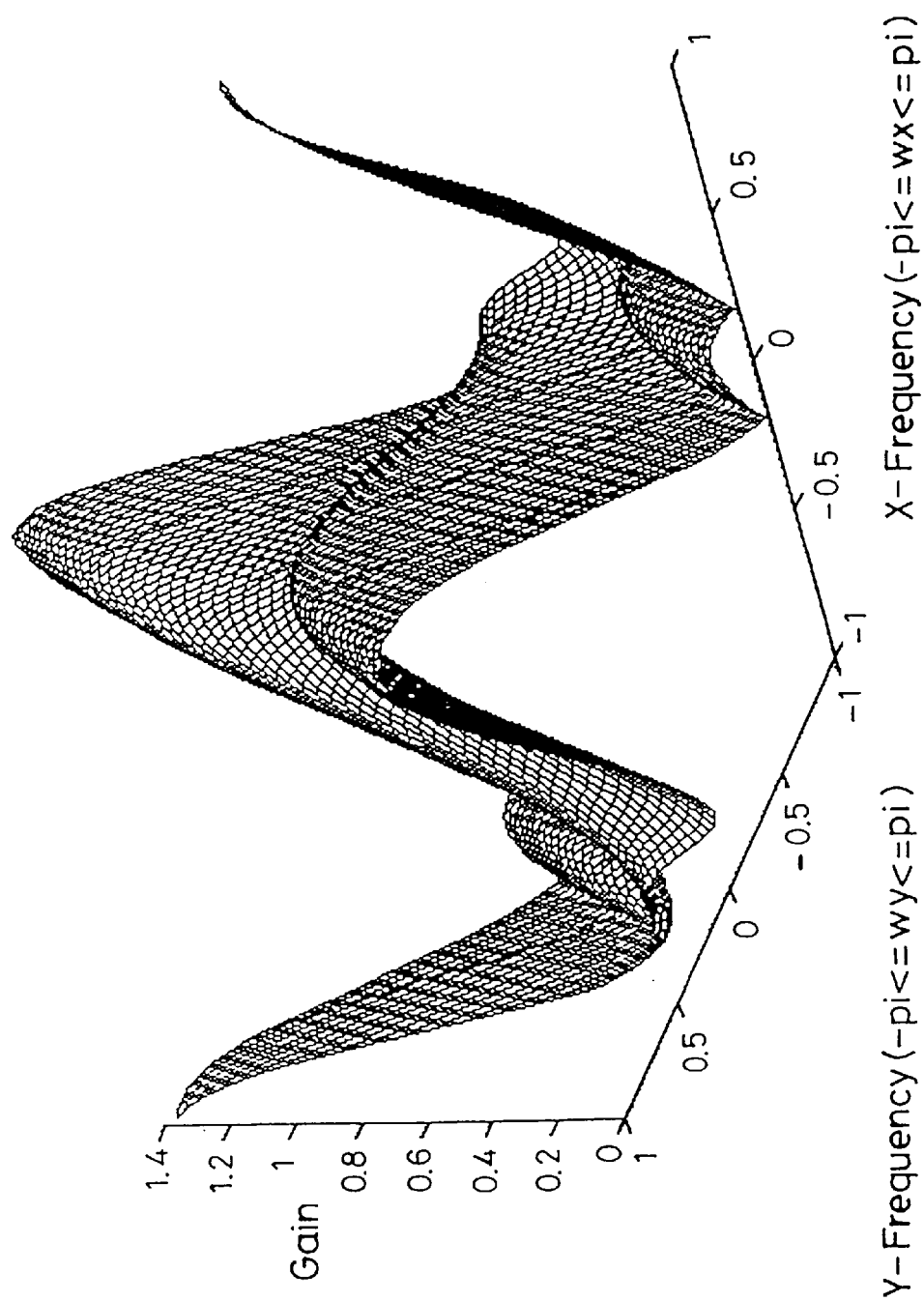
FIG. 13 is a graph showing a frequency characteristic of a coefficient $H_6(Z_i, Z_j))$ according to the present invention
Figure 14:
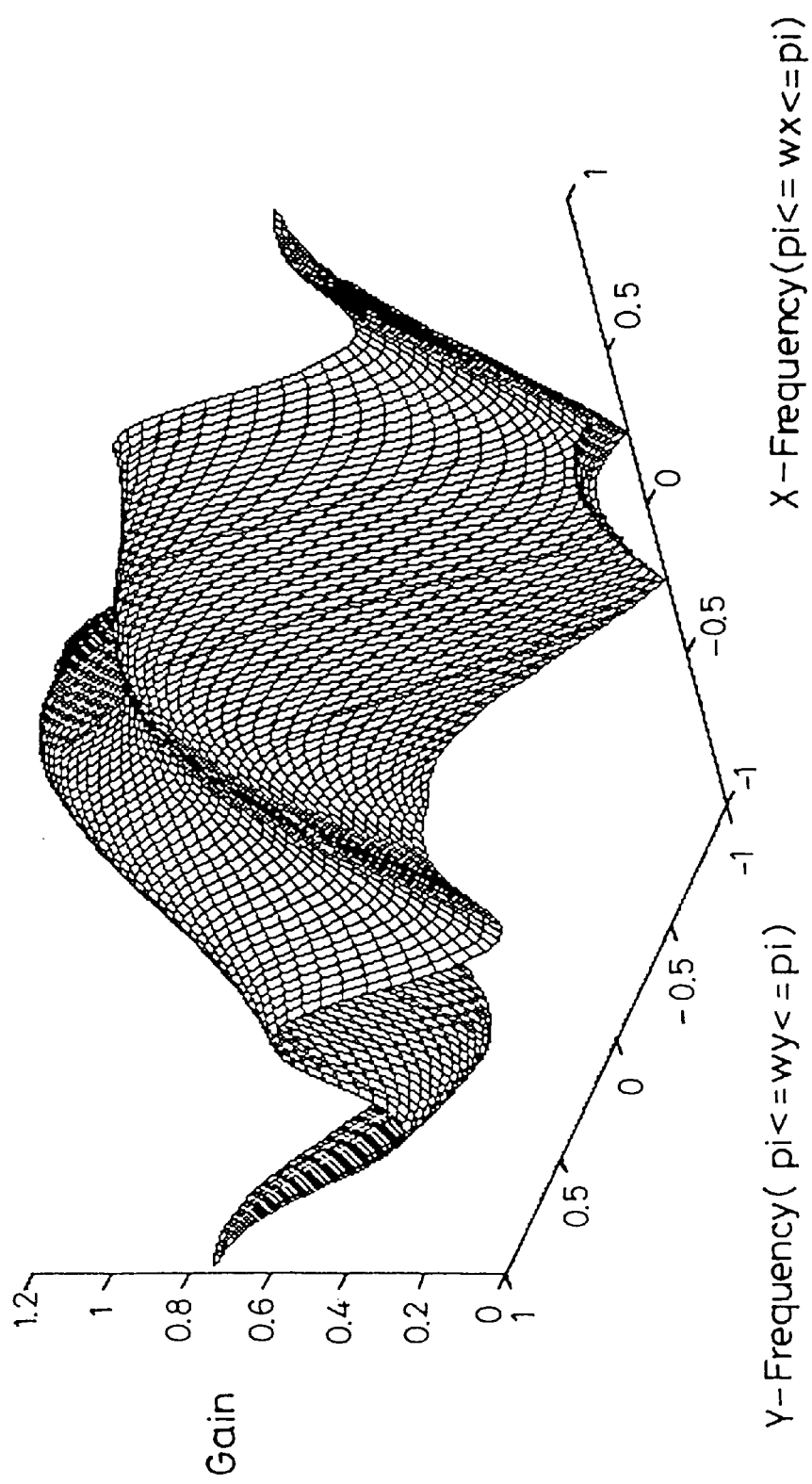
FIG. 14 is a graph showing a frequency characteristic of a coefficient $H_7(Z_i, Z_j))$ according to the present invention.
Figure 15:
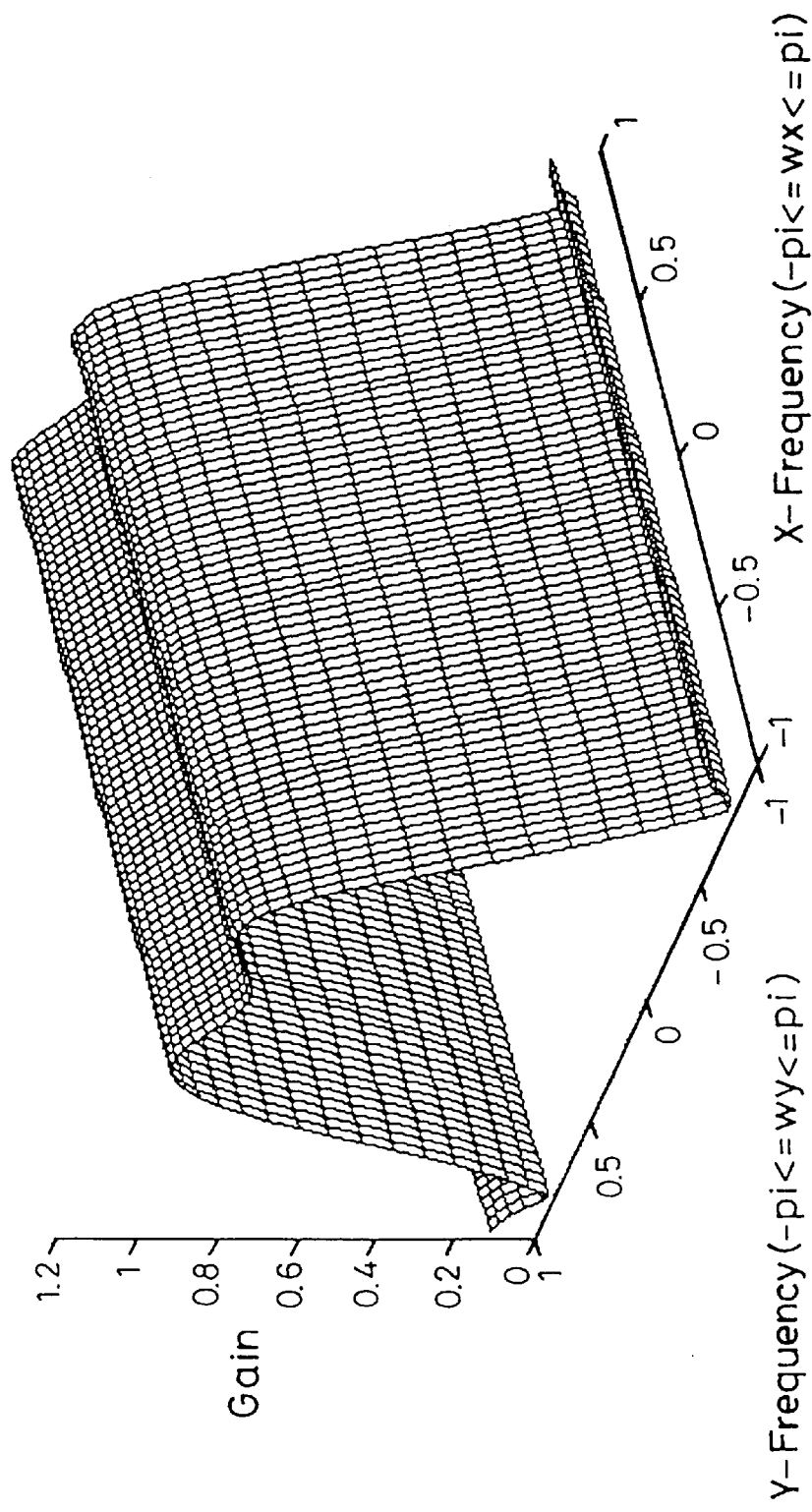
FIG. 15 is a graph showing a frequency characteristic of a coefficient $H_4(Z_i, Z_j))$ according to the present invention.
Figure 16:
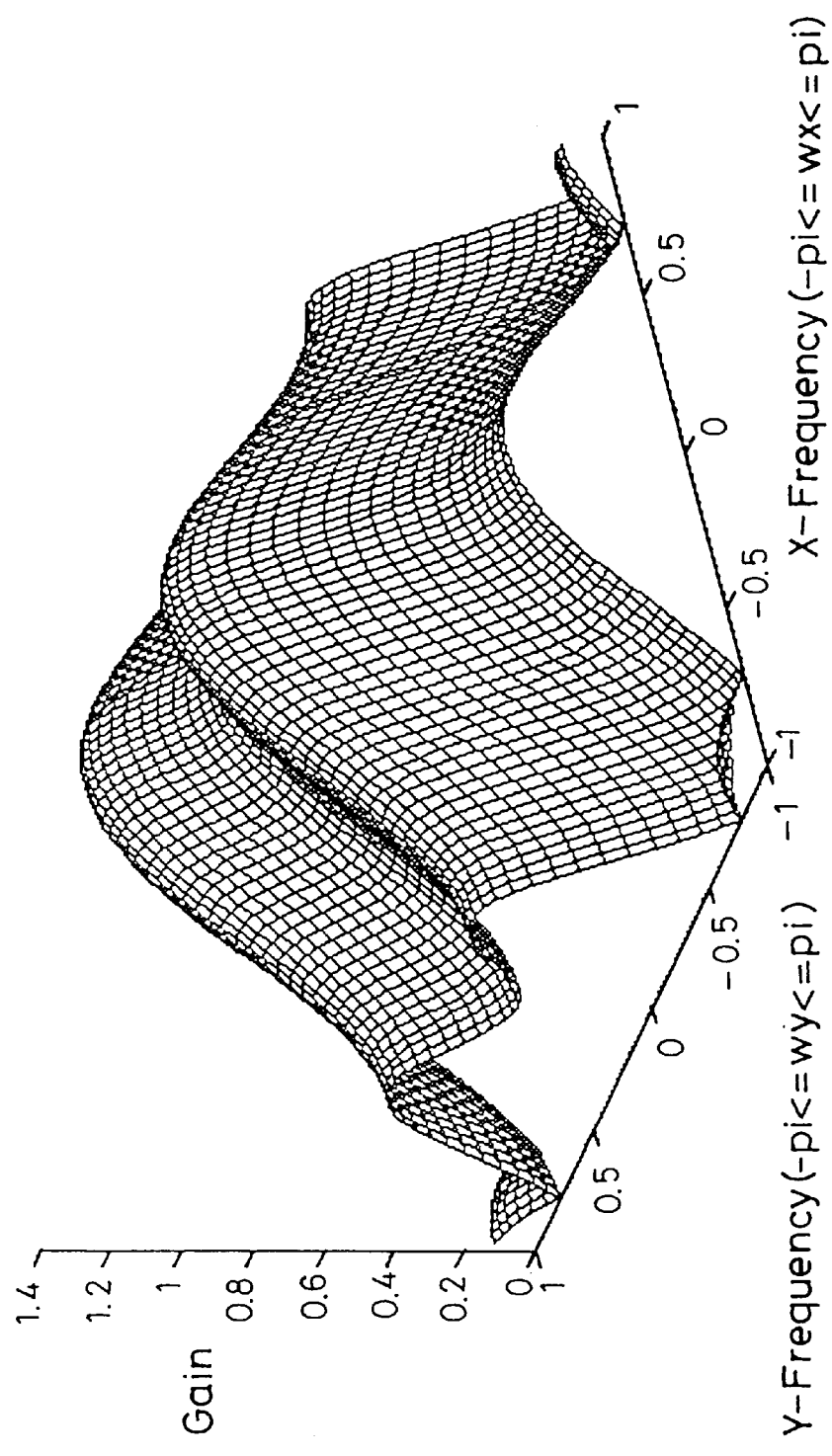
FIG. 16 is a graph showing a frequency characteristic of a coefficient $H_8(Z_i, Z_j))$ according to the present invention.

FIGS. 12 to 16 show frequency characteristics of the coefficients $H_1(Zi, Zj)$ to $H_8(Zi, Zj)$ of the two-dimensional adaptive filter. Each of the frequency characteristics shown in FIGS. 12 to 16 shows a gain relative to two dimensions of an X-frequency and a Y-frequency. FIG. 12 shows the frequency characteristic of the coefficient $H_5(Zi, Zj)$. The frequency characteristic of the coefficient $H_1(Zi, Zj)$ is one obtained by inverting the frequency characteristic of the coefficient $H_5(Zi, Zj)$ shown in FIG. 12 in the left and right direction relative to X=0. FIG. 13 shows the frequency characteristic of the coefficient $H_6(Zi, Zj)$. The frequency characteristic of the coefficient $H_2(Zi, Zj)$ is one obtained by inverting the frequency characteristic of the coefficient $H_6(Zi, Zj)$ shown in FIG. 13 in the left and right direction relative to X=0. FIG. 4 shows the frequency characteristic of the coefficient $H_7(Zi, Zj)$. The frequency characteristic of the coefficient $H_3(Zi, Zj)$ is one obtained by inverting the frequency characteristic of the coefficient $H_7(Zi, Zj)$ shown in FIG. 14 in the left and right direction relative to X=0. Thus, the frequency characteristics of the coefficients $H_1(Zi, Zj)$, $H_2(Zi, Zj)$ and $H_3(Zi, Zj)$ are ones obtained by inverting the frequency characteristics of the coefficients $H_5(Zi, Zj)$, $H_6(Zi, Zj)$ and $H_7(Zi, Zj)$ in the sub scanning directions, respectively. FIG. 15 shows the frequency coefficient $H_4(Zi, Zj)$. FIG. 16 shows frequency characteristic of the coefficient $H_8(Zi, Zj)$.

These filter coefficients have directivity and form the two-dimensional low-pass filter, and characteristics which permit the jaggy components in the edge direction to be cut and permit sharpness of the edge in the direction perpendicular to the edge direction to be kept. Therefore, the diagonal-direction edge is prevented from being jaggy and can be interpolated smoothly.

In comparison with a method of employing a mean value of pixels, it is possible to form a low-pass filter (LPF) having better characteristic, and hence the blur of the image can be suppressed. Moreover, these filters process the simply twice-enlarged image, it is possible to achieve the advantage that the edge in the horizontal direction can be kept without being blurred as compared with the method of employing the mean value of the pixels.

As described above, according to the first embodiment of the present invention, the diagonal-direction edge is smoothly interpolated, and hence it is possible to obtain an interpolated image which is less blurred and substantially free from deformation of the character or the like and which has a high picture quality.

The present invention is not limited to the above first embodiment and can be applied to an operation of printing a low-resolution image by a digital color printer with high resolution and a software for making a resolution of the image higher by a computer.

The pixels may be enlarged twice by interpolation according to the first embodiment to thereafter convert the resolution by a resolution converting means which can change a scale factor freely. In this case, it is possible to obtain an output image having higher picture quality as compared with that of an image obtained by converting a resolution solely by a resolution converting means which can change a scale factor freely.

An image resolution converting apparatus according to a second embodiment of the present invention will be described. The image resolution converting apparatus according to the second embodiment enlarges a digital image with an interpolator formed by connecting interpolators having similar arrangements at multi-stages in series and then decimates the same to thereby change a resolution of the image. Thus, it is possible to achieve an output image having a high picture quality substantially similar to that obtained by a by-cubic method., and it is possible to realize achievement of such output image with a simple arrangement, low costs, and no multiplier.

A color video printer to which the image resolution converting apparatus according to the second embodiment is applied will be described. The color video printer according to the second embodiment has the same arrangement as the color video printer according to the first embodiment except that, particularly, a video processing unit 9 of the color video printer according to the second embodiment has a re-sizing block 18 which enlarges a digital image by using an interpolator having a multi-stage arrangement and then decimates the same to thereby convert the resolution of the image. Therefore, the arrangements of the color video printer shown in FIG. 1 and the video processor unit 9 shown in FIG. 2 will not be described in detail.

The re-sizing block 18 has an interpolator for up-sampling a video data and passing the video data through an interpolation filter to thereby enlarge the number of data at a predetermined scale factor, and a decimating circuit for decimating pixels close to a position of a predetermined output pixel. The re-sizing block 18 changes the resolution of the image data in one direction at a desired scale factor.

Figure 17:
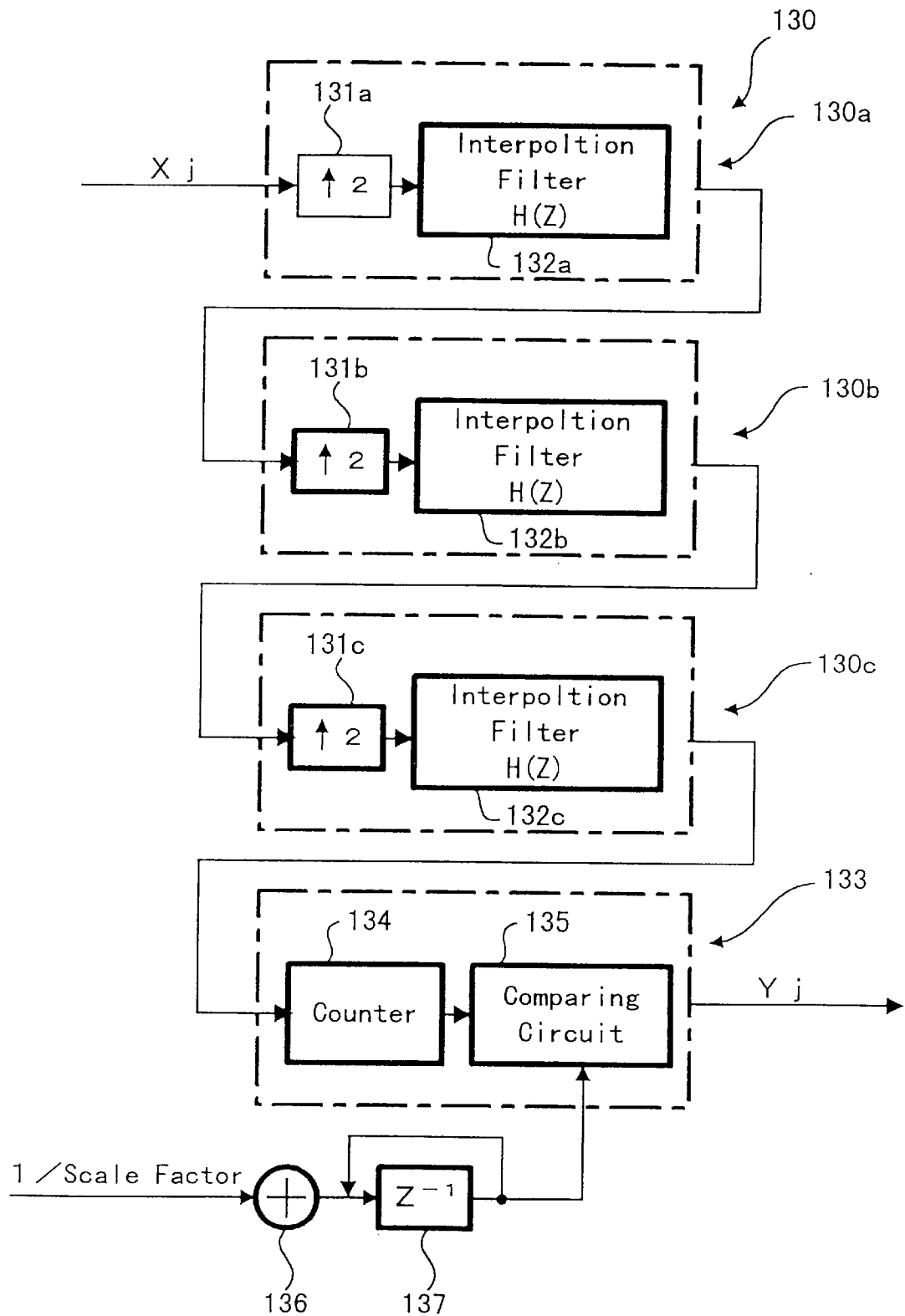
FIG. 17 is a block diagram showing an arrangement of a re-sizing block as an image resolution converting apparatus according to a second embodiment of the present invention.

FIG. 17 is a diagram showing an arrangement of the re-sizing block 18 as the image resolution converting apparatus. As shown in FIG. 17, the re-sizing block 18 has a multi-stage interpolator 130, a decimating circuit 133, an adder circuit 136 and a sample delay circuit 137. In FIG. 17, Xj depicts an input video data, and Yj depicts an output video data. j depicts the main scanning direction (line direction).

The multi-stage interpolator 130 has a first double interpolator 130a, a second double interpolator 130b, and a third double interpolator 130c. The first double interpolator 130a has a circuit 131a subjecting an input video data Xj to double up-sampling processing, and an interpolation filter 132a for smoothly interpolating the video data subjected to the double up-sampling processing. The first double interpolator 130a has a function to enlarge the input video data Xj twice.

The second double interpolator 130b has a circuit 131b subjecting the video data enlarged twice by interpolation to double up-sampling processing, and an interpolation filter 132b for smoothly interpolating the video data subjected to the double up-sampling processing. The second double interpolator 130a has a function to enlarge the video data enlarged twice by interpolation to consequently enlarge the input video data Xj four times.

The third double interpolator 130c has a circuit 131c subjecting the video data enlarged four times by interpolation to double up-sampling processing, and an interpolation filter 132c for smoothly interpolating the video data subjected to the double up-sampling processing. The third double interpolator 130c has a function to enlarge the video data enlarged four times by interpolation to consequently enlarge the input video data Xj eight times.

Specifically, the multi-stage interpolator 130 is formed by connecting the double interpolator having the same arrangements at three stages in series. The multi-stage interpolator 130 has the double interpolators connected in series at three stages and hence has a function to enlarge the input video data Xj eight times.

The decimating circuit 133 has a counter 134 for successively counting the video data enlarged eight times by interpolation and a comparator circuit for comparing an count output with a desired output pixel position to output an output video data Yj when they are agreed with each other.

The re-sizing block 18 has a sample delay circuit 137 for outputting a signal delayed by one sample time as a desired output pixel position signal, and an adder circuit 136 for adding the desired output pixel position signal with a signal indicative of an inverse number of a scale factor when the count output and the desired output pixel position signal are agreed with each other, to then increment the signal.

An operation of the re-sizing block 18 thus arranged will hereinafter be described.

Figure 18A:
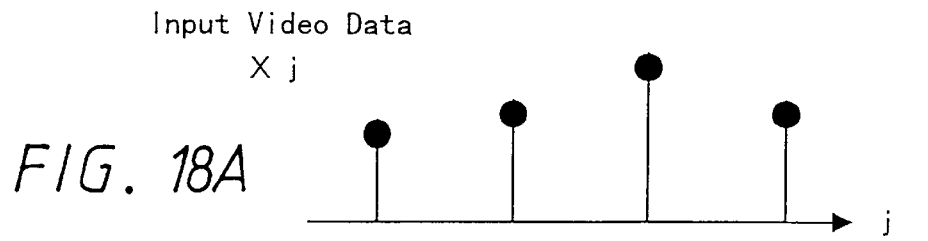
Figure 18B:
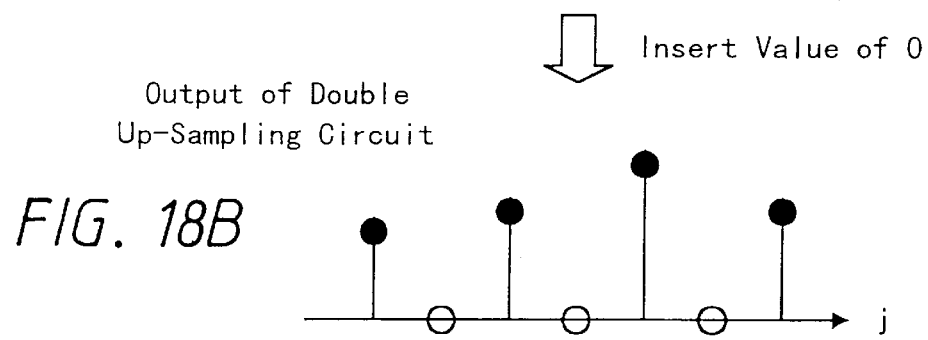
Figure 18C:
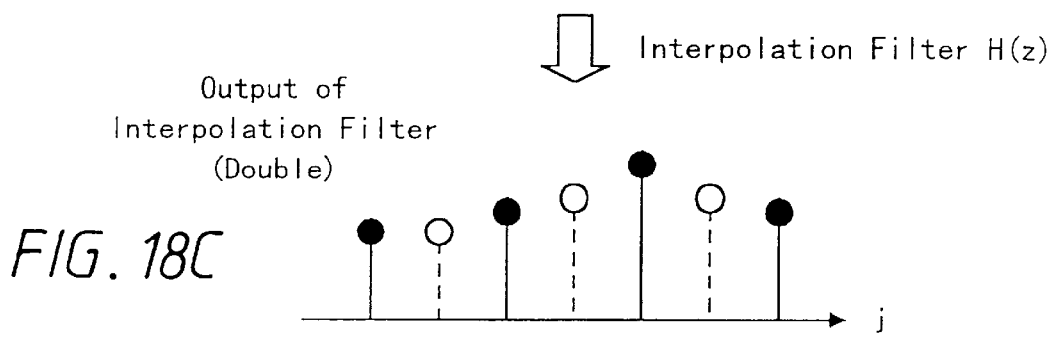

Initially, an operation of the multi-stage interpolator 130 will be described. The double up-sampling circuit 131a of the first double interpolator 130a subjects the input video data Xj to double up-sampling processing, and the interpolation filter 132a smoothly interpolates the video data subjected to the double up-sampling processing. Thus, the first double interpolator 130a enlarges the input video data Xj twice. Specifically, the first double interpolator 130a subjects the input video data Xj shown in FIG. 18A to the double up-sampling processing to thereby insert values of zero upon the double up-sampling processing into positions between the values obtained at an original sampling point, thereby obtaining an output signal from the double up-sampling circuit 131a into which the values of zero upon the double up-sampling processing are inserted as shown in FIG. 18B. Further, the interpolation filter 132a smoothly interpolates the values of zero upon the double up-sampling processing to obtain the output signal (having the number of pixels enlarged twice) from the interpolation filter shown in FIG. 18C.

The double up-sampling circuit 131b of the second double interpolator 130b subjects the video data enlarged twice to double up-sampling processing, and the interpolation filter 132b smoothly interpolates the video data subjected to the double up-sampling processing. Thus, the second double interpolator 130b further enlarges the video data, which has been enlarged twice, twice to thereby consequently enlarges the video data four times. Specifically, the second double interpolator 130b subjects the video data enlarged twice shown in FIG. 18A to the double up-sampling processing to thereby insert values of zero upon the double up-sampling processing into positions between the values obtained at an original sampling point, thereby obtaining an output signal from the double up-sampling circuit 131b into which the values of zero upon the double up-sampling processing are inserted as shown in FIG. 18B. Further, the interpolation filter 132b smoothly interpolates the values of zero upon the double up-sampling processing to obtain the output signal (having the number of pixels enlarged four times) from the interpolation filter shown in FIG. 18C.

The double up-sampling circuit 131c of the third double interpolator 130c subjects the video data enlarged four times to double up-sampling processing, and the interpolation filter 132c smoothly interpolates the video data subjected to the double up-sampling processing. Thus, the third double interpolator 130c further enlarges the video data, which has been enlarged four times, twice to thereby consequently enlarge the video data eight times by interpolation. Specifically, the third double interpolator 130c subjects the video data enlarged four times shown in FIG. 18A to the double up-sampling processing to thereby insert values of zero upon the double up-sampling processing into positions between the values obtained at an original sampling point, thereby obtaining an output signal from the double up-sampling circuit 131c into which the values of zero upon the double up-sampling processing are inserted as shown in FIG. 18B. Further, the interpolation filter 132c smoothly interpolates the values of zero upon the double up-sampling processing to obtain the output signal (having the number of pixels enlarged eight times) from the interpolation filter shown in FIG. 18C.

Each of the double interpolater 130a, 130b, 130c inserts the values of zero upon the double up-sampling processing into positions between the values obtained at the original sampling point. Each of the interpolation filter 132a, 132b, 132c which is a low-pass filter having a pass band of $0 \leq \omega \leq \pi$ relative to a normalized angular frequency $\omega$ obtained at the double up-sampling processing interpolates the data to obtain the smooth signal. As a result, the video data is enlarged about eight times as much as the number of the heating elements of the thermal head. Thus, the multi-stage interpolator 130 outputs the video data enlarged eight times in the main scanning direction as a signal output from the multi-stage interpolator.

Figure 18D:
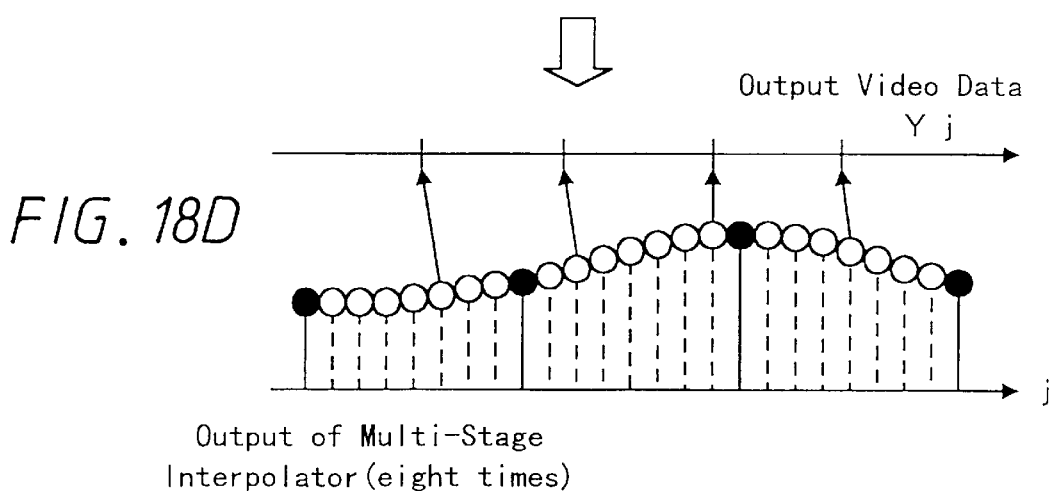

An operation of the decimating circuit 33 will be described. The counter 134 forming a shift register, for example, successively counts and shifts the output signal from the multi-stage interpolator shown in FIG. 18D and then outputs it. A signal output from the counter 134 is successively supplied to one input terminal of the comparator circuit 135. The desired output pixel position signal is supplied to the other input terminal. Specifically, the desired output pixel position signal serves as a sampling signal used to determine at which sampling point a value is output from the comparator circuit 35. For example, when, as shown in FIG. 18D, the comparator circuit 135 outputs a value at a 5th sampling point of the video data enlarged eight times by the multi-stage interpolator 130 to enlarge the video data 8/5 times, a value of the first 5th sampling point is output and then added in the adder circuit 136 for increment. Further, a value at the second 5th sampling point is output and then added in the adder circuit 136 for increment. Similarly, a value at the third 5th sampling point is output and then added in the adder circuit 136 for increment. Thus, the comparator circuit 135 successively outputs the output video data Yj. Specifically, since the multi-stage interpolator 30 enlarges the input video data Xj eight times, it is possible to output the output video data at a desired scale factor up to 8 by determining at which sampling point a value is used for comparison with the image data enlarged eight times. Since a pixel closest to the desired output pixel position is selected upon decimation in response to the sampling rate of the desired output pixel position signal, it is possible to carry out the processing for converting the resolution. All the values at eight sampling points may be output. The output image data may be output at a desired factor scale up to a value of 8. 1/scale factor=⅝ input to the adder 136 is set in the register 12 shown in FIG. 2, and since the sampling point for the video data enlarged eight times is ⅝×8=5 samples, the sampling is carried out at every fifth sampling point.

Coefficients of the interpolation filter employed in the multi-stage interpolator 130 will be described.

FIG. 19 shows coefficients of the interpolation filter H(Z). This interpolation filter is formed of seven taps and has coefficients for the sampling points $Z^3$, $Z^2$, $Z^1$, 0, $Z^{-1}$, $Z^{-2}$, $Z^{-3}$ in the main scanning direction j. These coefficients are $-⅛$, 0, $+⅝$, $+1$, $+⅝$, 0, $-⅛$ in the main scanning direction j. For example, these coefficients are used for calculation of seven pixels of the pixel numbers 6, 5, 4, 3, 2, 1, 0 in the main scanning direction j.

Figure 20:
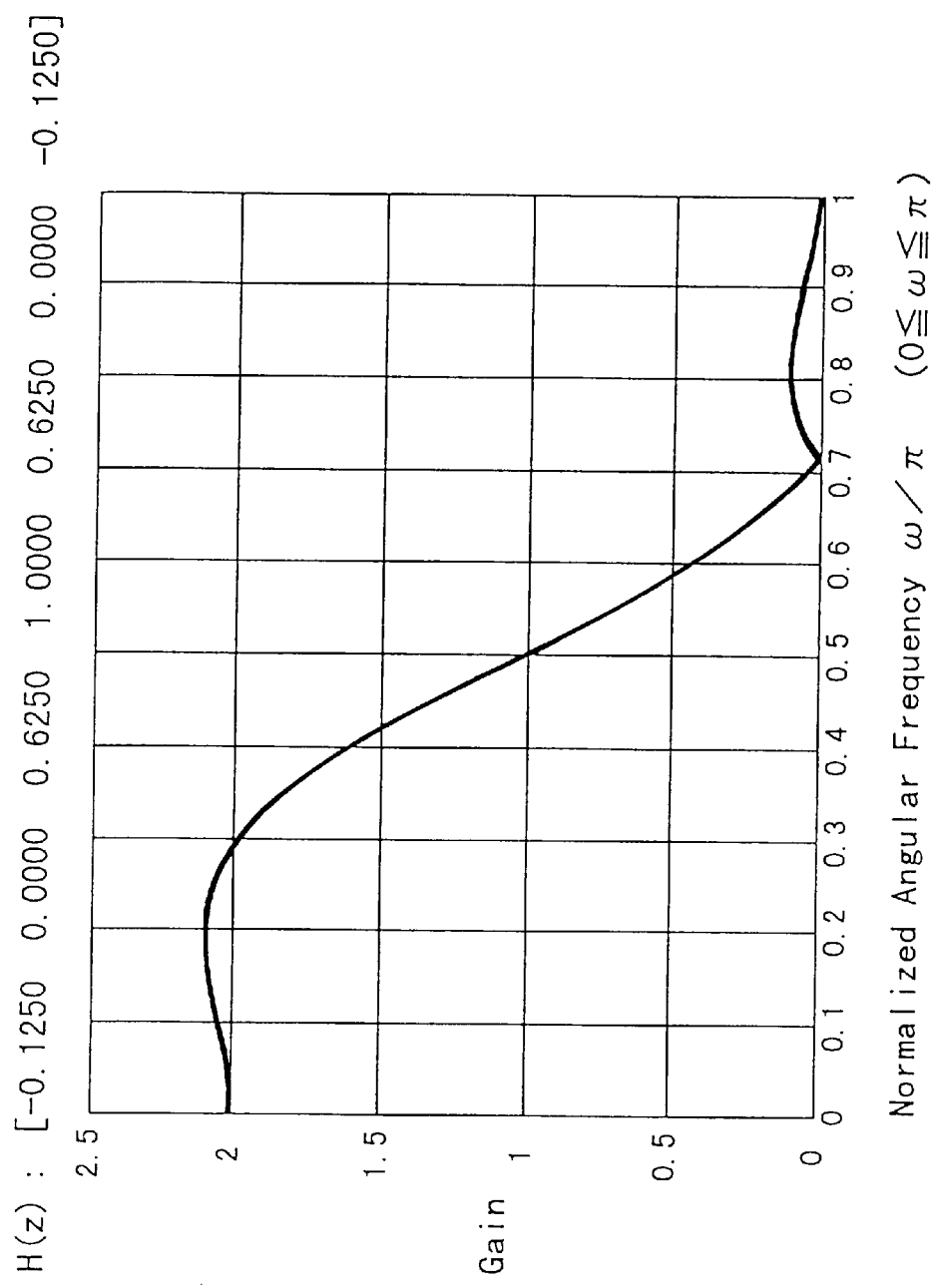
FIG. 20 is a graph showing a frequency characteristic of the interpolation filter H(Z) according to the second embodiment.

FIG. 20 shows a frequency characteristic of the interpolation filter. In FIG. 20, an abscissa thereof represents a quotient obtained by dividing a normalized angular frequency $\omega$ by $\pi$, and an ordinate thereof represents a gain. Specifically, the coefficients of the interpolation filter H(Z) represent a frequency characteristic of the low-pass filter having a pass band of $0 \leq \omega \leq \pi/2$. The coefficients of the interpolation filter H(Z) are, if expressed with decimal, $-0.1250$, $0.0000$, $0.6250$, $1.0000$, $0.6250$, $0.0000$, $-0.1250$.

As described above, according to the image resolution converting apparatus according to the second embodiment, a processing of the by-cubic method providing a high picture-quality is realized by using the interpolation filter formed of the digital filter. Specifically, since the by-cubic method is a method of employing as an output pixel a value obtained by calculation of convolution of an input pixel and sinc function ($sinx/x \approx x^3 + x^2 + ...$) and a Fourier transform of sinc function is an ideal low-pass filtering processing, convolution of the input pixel and a result of the low-pass filtering processing corresponds to the processing of subjecting the input pixel to the low-pass filtering. Therefore, the result of the by-cubic method is substantially equivalent to that obtained by the image resolution converting apparatus according to the second embodiment.

Since the interpolation filter having the coefficients shown in FIG. 19 can be formed with a circuit scale of about four adders, it is possible to realize an image having a picture quality substantially as high as that obtained by employing the by-cubic method, with a simple arrangement and low costs.

Moreover, the coefficients of the interpolation filter H(Z) may be selected as shown in FIG. 21. The interpolation filter is formed of eight taps and has coefficients for the sampling points $Z^3$, $Z^2$, $Z^1$, 0, $Z^{-1}$, $Z^{-2}$, $Z^{-3}$, $Z^{-4}$ in the main scanning direction j. These coefficients are $-3/64$, $-9/64$, $+19/64$, $+57/64$, $+57/64$, $+19/64$, $-9/64$, $-3/64$ in the main scanning direction j. For example, these coefficients are used for calculation of eight pixels of the pixel numbers 7, 6, 5, 4, 3, 2, 1, 0 in the main scanning direction j.

If the interpolation filter is formed so as to have the above coefficients, it is possible to obtain the interpolation filter having almost the same frequency characteristics as those of the interpolation filter shown in FIG. 19 and a phase different by a half pixel from that of the interpolation filter shown in FIG. 19. When such interpolation filter is employed and a magnification power is a multiple of an integer, it is possible to obtain an output image having no blur at the edge. Specifically, if an image is enlarged twice, then a phase thereof is converted so that the same two pixel should be arranged side by side, which allows the edge to be kept.

In the second embodiment, the interpolator can have multi-stages which are two stages or larger in response to some factors such as a picture quality, costs, a scale factor or the like. If the image resolution converting apparatus according to the second embodiment has an anti-aliasing filter for removing an unnecessary high-band components at a stage preceding or succeeding the interpolater, then it is possible to form the image resolution converting apparatus which can provide a higher picture quality. The re-sizing block 18 may be employed as an aspect converting circuit for converting the number of scanning lines according to the PAL system into that according to the NTSC system.

The present invention is not limited to the above first embodiment and can be applied to an operation of printing a low-resolution image by a digital color printer with high resolution and a software for making a resolution of the image higher by a computer.

A picture enhancement apparatus according to a third embodiment of the present invention will be described. The picture enhancement apparatus according to the second embodiment enhances a video data of a digital picture by using tow filters, i.e., a filter for enhancing a high band and a wide filter for enhancing a little lower band and sets gains of the two filters independently. Therefore, it is possible to carry out enhancement of a desired frequency band as carried out by a simple equalizer and also to subject a picture having a low frequency band to effective enhancement.

A color video printer to which the picture enhancement apparatus according to the third embodiment is applied will be described. The color video printer according to the third embodiment has the same arrangement as the color video printer according to the first embodiment except that, particularly, a video processing unit 9 of the color video printer according to the third embodiment has a sharpness block 22 which enhances a video data of a digital picture by using tow filters, i.e., a filter for enhancing a high band and a wide filter for enhancing a little lower band and sets gains of the two filters independently. Therefore, the arrangements of the color video printer shown in FIG. 1 and the video processor unit 9 shown in FIG. 2 will not be described in detail.

Since in the third embodiment the sharpness block 22 enhances a video data of a digital picture by using tow filters, i.e., a filter for enhancing a high band and a wide filter for enhancing a little lower band and sets gains of the two filters independently, the sharpness block 22 can enhance a desired frequency band as carried out by a simple equalizer and also has a function to effect the effective enhancement on the picture having the low frequency band.

Figure 22:
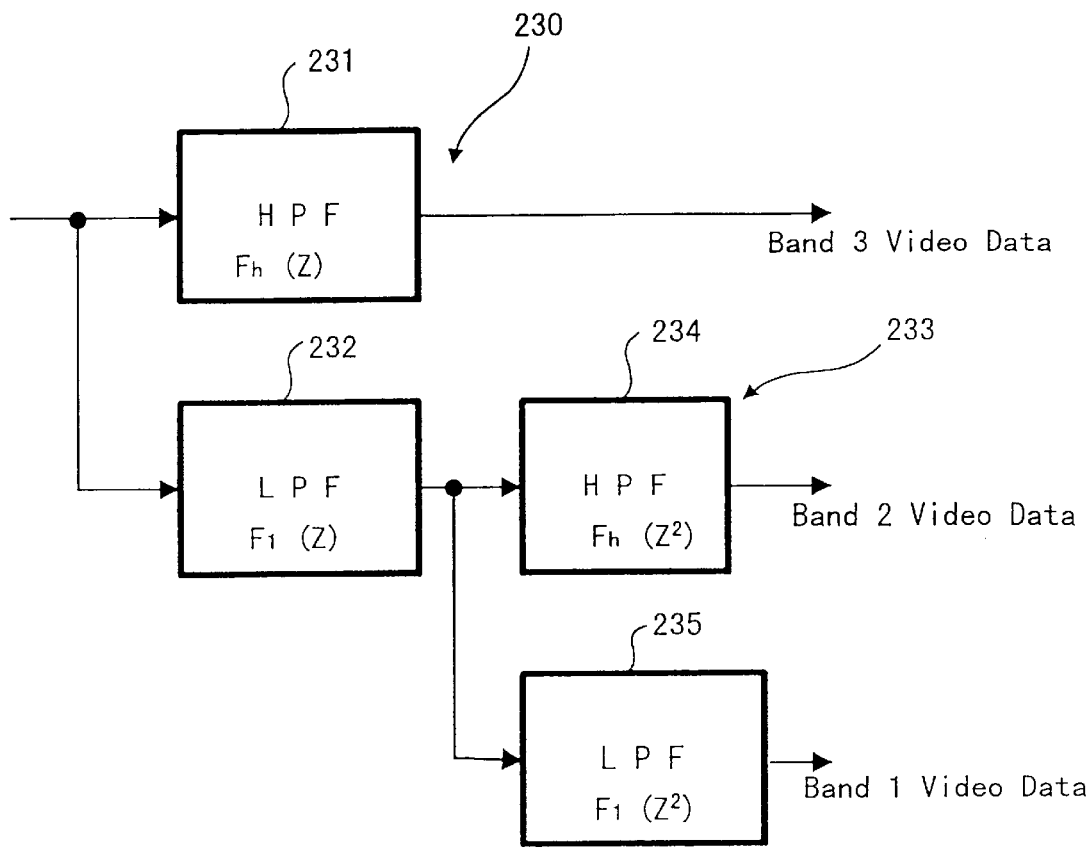
FIG. 22 is a block diagram showing an arrangement of a band dividing filter of a sharpness block as a picture enhancement apparatus according to a third embodiment of the present invention.

A specific arrangement and an operation of the picture enhancement apparatus according to the third embodiment will be described. FIG. 22 is a diagram showing a principle of an arrangement of a band dividing filter of the sharpness block 22. FIG. 22 shows an arrangement used for forming filters Fh(Z) and Fm(Z) described later on with reference to FIG. 30. The arrangement is not included in the sharpness block 22 shown in FIG. 2. As shown in FIG. 22, the band dividing filter of the sharpness block 22 has a first band dividing filter 230 for dividing an input video data U(Z) into data of high band and data of low band, and a second band dividing filter 233 for further dividing the data of low band, which has been divided by the first band dividing filter 230, into data of high band and data of low band.

The first band dividing filter 230 has a high-pass filter (HPF) 231 having filter coefficients Fh(Z) and a low-pass filter (LPF) 232 having filter coefficients Fl(Z). The filter coefficients Fh(Z) for sampling points $Z^{-1}$, 0, $Z^{+1}$ are $-0.25$, 0.5, $-0.25$, respectively. The filter coefficients Fl(Z) for sampling points $Z^{-1}$, 0, $Z^{+1}$ are 0.25, 0.5, 0.25, respectively. The second band dividing filter 233 has a high-pass filter (HPF) 234 having filter coefficients $Fh(Z^2)$ and a low-pass filter (LPF) 235 having filter coefficients $Fl(Z^2)$.

The band dividing filters having the above arrangements of the sharpness block 22 are operated as follows. The HPF 231, having the filter coefficients Fh(Z), of the first band dividing filter 230 divides the input video data U(Z) to obtain data of high band, thereby obtaining a band 3 video data Fh(Z)U(Z). The LPF 232, having the filter coefficients Fl(Z), of the first band dividing filter 230 divides the input video data U(Z) to obtain data of low band, thereby obtaining a band 3 video data Fl(Z)U(Z). Further, the HPF 234, having the filter coefficients $Fh(Z^2)$, of the second band dividing filter 233 divides the video data Fl(Z)U(Z) to obtain data of high band, thereby obtaining a band 2 video data $Fh(Z^2)Fl(Z)U(Z)$. The LPF 235, having the filter coefficients $Fh(Z^2)$, of the second band dividing filter 233 divides the video data Fl(Z)U(Z) to obtain data of low band, thereby obtaining a band 1 video data $Fl(Z^2) Fl(Z)U(Z)$. Coefficients of the filter Fh(Z) for passing data of the band 3, the filter $Fh(Z^2)Fl(Z)$ for passing data of the band 2, and the filter $Fl(Z^2)Fl(Z)$ for passing data of the band 1 respectively represent transfer functions in a response system for the input video data U(Z).

Figure 23:
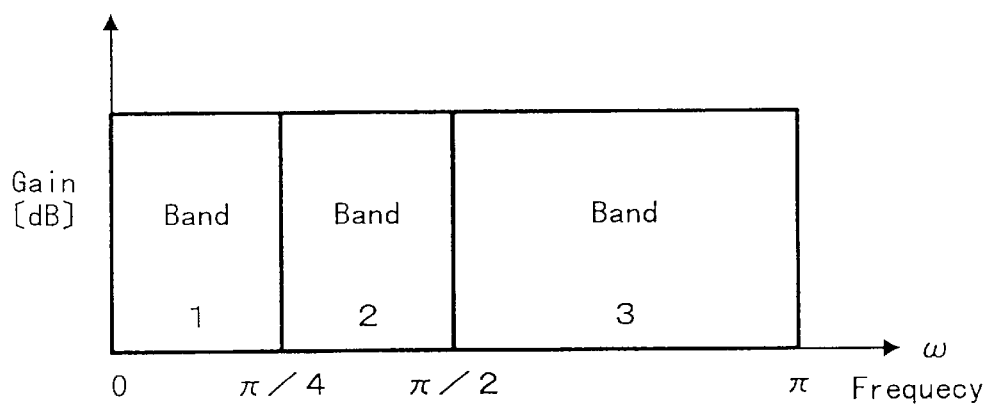
FIG. 23 is a diagram used to explain a band dividing operation of the band dividing filter according to the third embodiment.

FIG. 23 is a diagram used to explain an operation of dividing a frequency by the band dividing filters of the sharpness block 22. In FIG. 22, an abscissa thereof represents a frequency, and an ordinate thereof represents a gain. Assuming that a frequency band ω of the input video data U(Z) is $0 \leq \omega \leq \pi$, a frequency band ω3 of the band 3 video data Fh(Z)U(Z) is $\pi/2 \leq \omega 3 \leq \pi$, a frequency band ω2 of the band 2 video data $Fh(Z^2) Fl(Z)U(Z)$ is $\pi/4 \leq \omega 2 \leq \pi/2$, and a frequency band ω1 of the band 1 video data $Fl(Z^2)Fl(Z)U(Z)$ is $0 \leq \omega 3 \leq \pi/4$. If the frequency band is divided into higher and lower bands and the divided lower frequency band is further divided into higher and lower bands, thus consequently the frequency band being successively divided into smaller bands, then it is possible to divide the frequency band w of the input video data U(Z) to obtain the desired low band where an enhanced picture is desired. Such division method is called an octave division.

Figure 24:
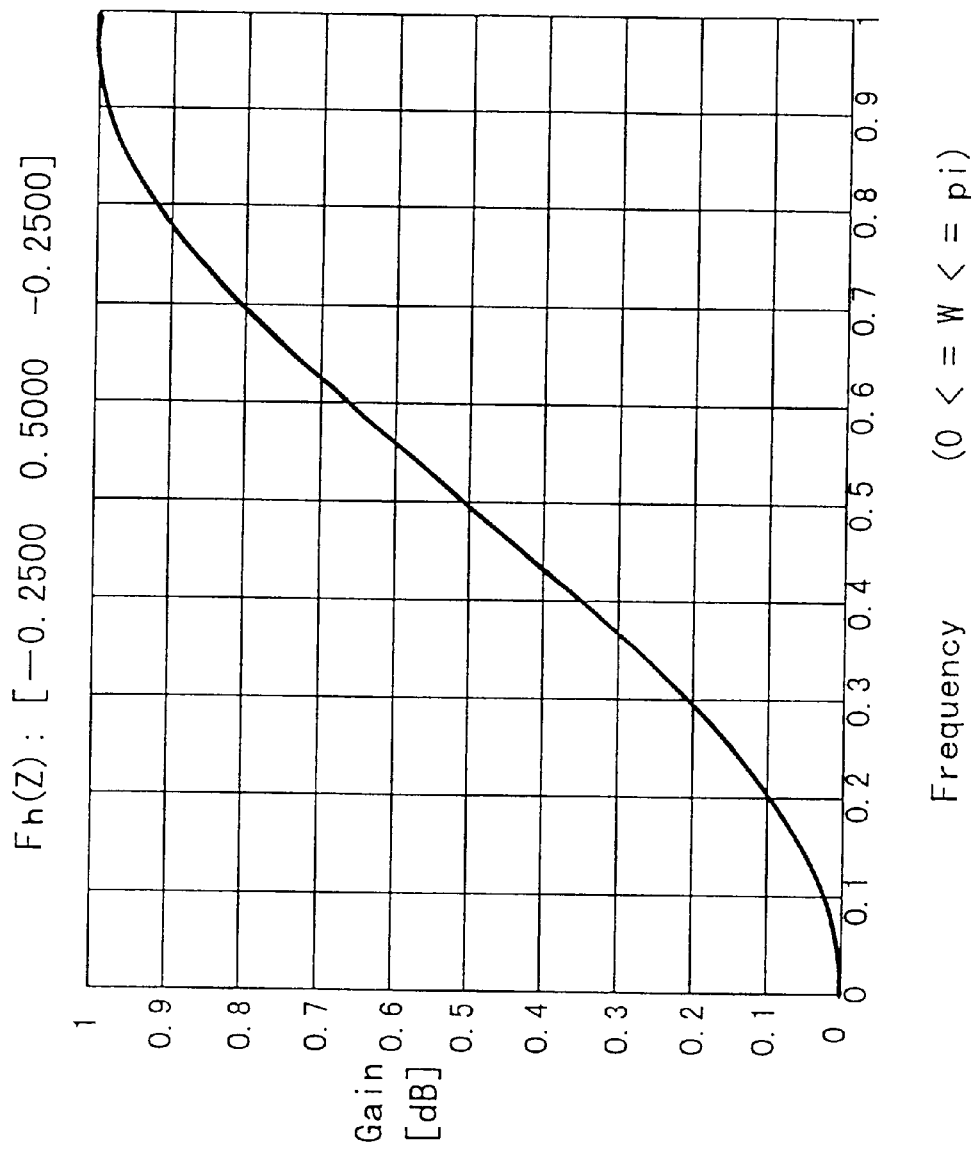
FIG. 24 is a graph showing a frequency characteristic of a low-pass filter Fh(Z) (band 3 Fh(Z)) of the band dividing filter according to the third embodiment.

FIGS. 24 to 29 are graphs showing frequency characteristics of the filters forming such band dividing filter. In each of FIGS. 24 to 29, an abscissa thereof represents a frequency and an ordinate thereof represents a gain. It is assumed that π=1 is established in the frequency band ω ($0 \leq \omega \leq \pi$) of the input video data U(Z). FIG. 24 is a graph showing frequency characteristics of the HPF 231, which has the filter coefficients Fh(Z), of the first band dividing filter 230. As shown in FIG. 24, when the frequency band ω3 of the filter Fh(Z) for passing the data of the band 3 is $\pi/2 \leq \omega 3 \leq \pi$, a gain $G_3$ is $0.5 \leq G_3 \leq 1$, which reveals that the filter Fh(Z) has high-pass characteristic. Filter coefficients of the filter Fh(Z) for the sampling points of $Z^{-1}$, 0, $Z^{+1}$ are $-0.2500$, 0.5000, $-0.2500$, respectively.

Figure 25:
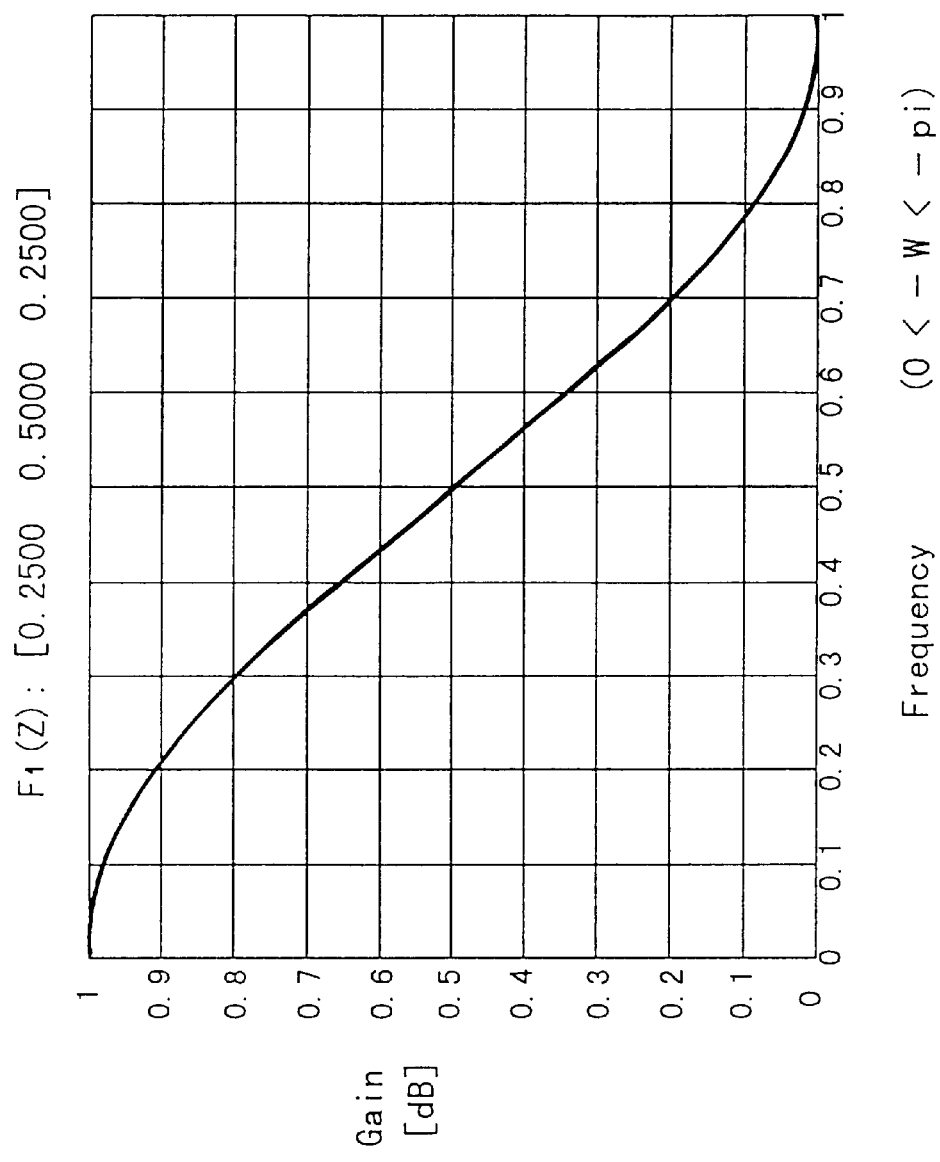
FIG. 25 is a graph showing a frequency characteristic of a low-pass filter Fl(Z) of the band dividing filter according to the third embodiment.

FIG. 25 is a graph showing frequency characteristics of the LPF 232, which has the filter coefficients Fl(Z), of the first band dividing filter 230. As shown in FIG. 25, when the frequency band ω2' of the filter Fl(Z) is $0 \leq \omega 2' \leq \pi/2$, a gain $G_{2'}$ is $0.5 \leq G_{2'} \leq 1$. Filter coefficients of the filter Fl(Z) for the sampling points of $Z^{-1}$, 0, $Z_{+1}$ are 0.2500, 0.5000, 0.2500, respectively, which reveals that the filter Fl(Z) has low-pass characteristic.

Figure 26:
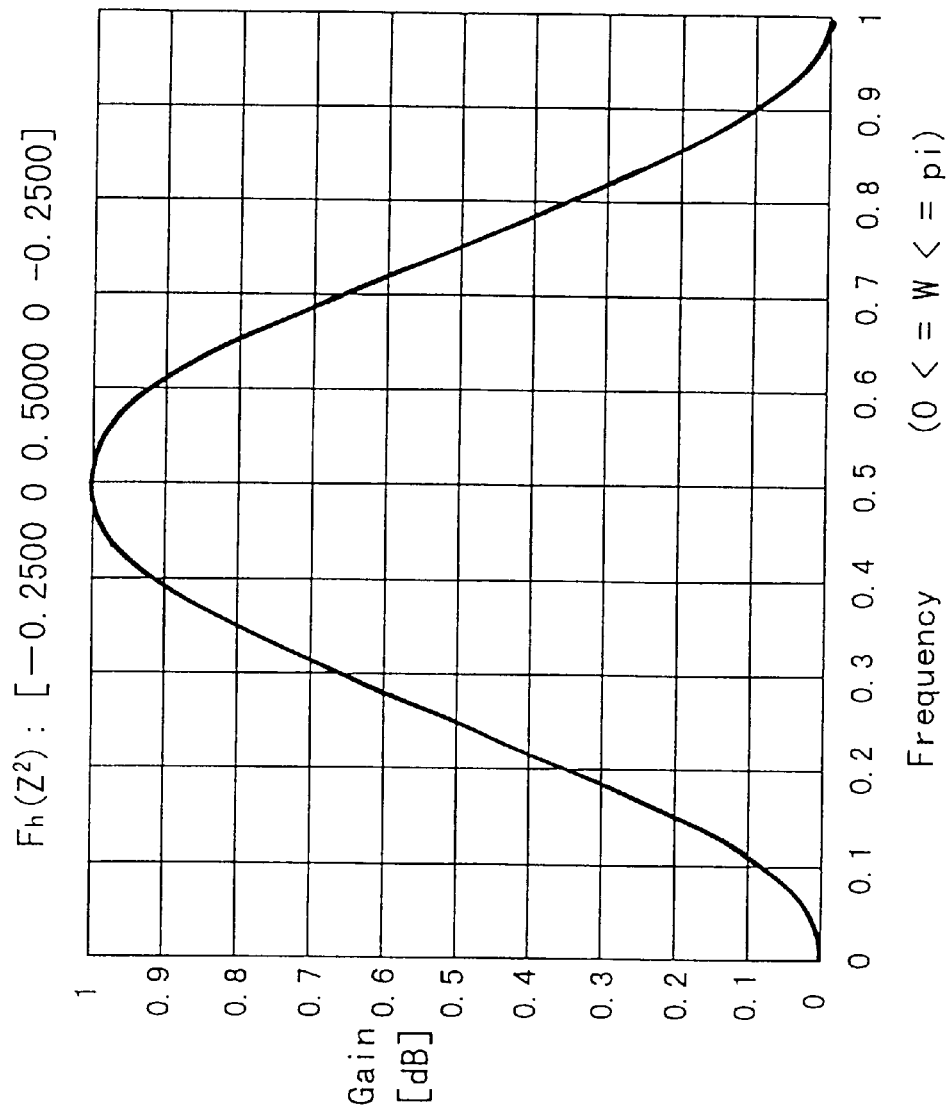
FIG. 26 is a graph showing a frequency characteristic of a high-pass filter $Fh(Z^2)$ of the band dividing filter according to the third embodiment.

FIG. 26 is a graph showing frequency characteristics of the HPF 234, which has the filter coefficients Fh($Z^2$), of the second band dividing filter 233. As shown in FIG. 26, when the frequency band ω2" of the filter Fh($Z^2$) is $\pi/4 \leq \omega'' \leq \pi3/4$, a gain $G_2''$ is $0.5 \leq G_{2''} \leq 1$. Filter coefficients of the filter Fh($Z^2$) for the sampling points of $Z^{-2}$, $Z^{-1}$, 0, $Z^{+1}$, $Z^{+2}$ are −0.2500, 0, 0.5000, 0, −0.2500, respectively, which reveals that the filter Fh($Z^2$) has high-pass characteristic for the frequency band ω2' ($0 \leq \omega2' \leq \pi/2$) of the filter coefficients of the filter Fl(Z) of the first band dividing filter 230.

Figure 27:
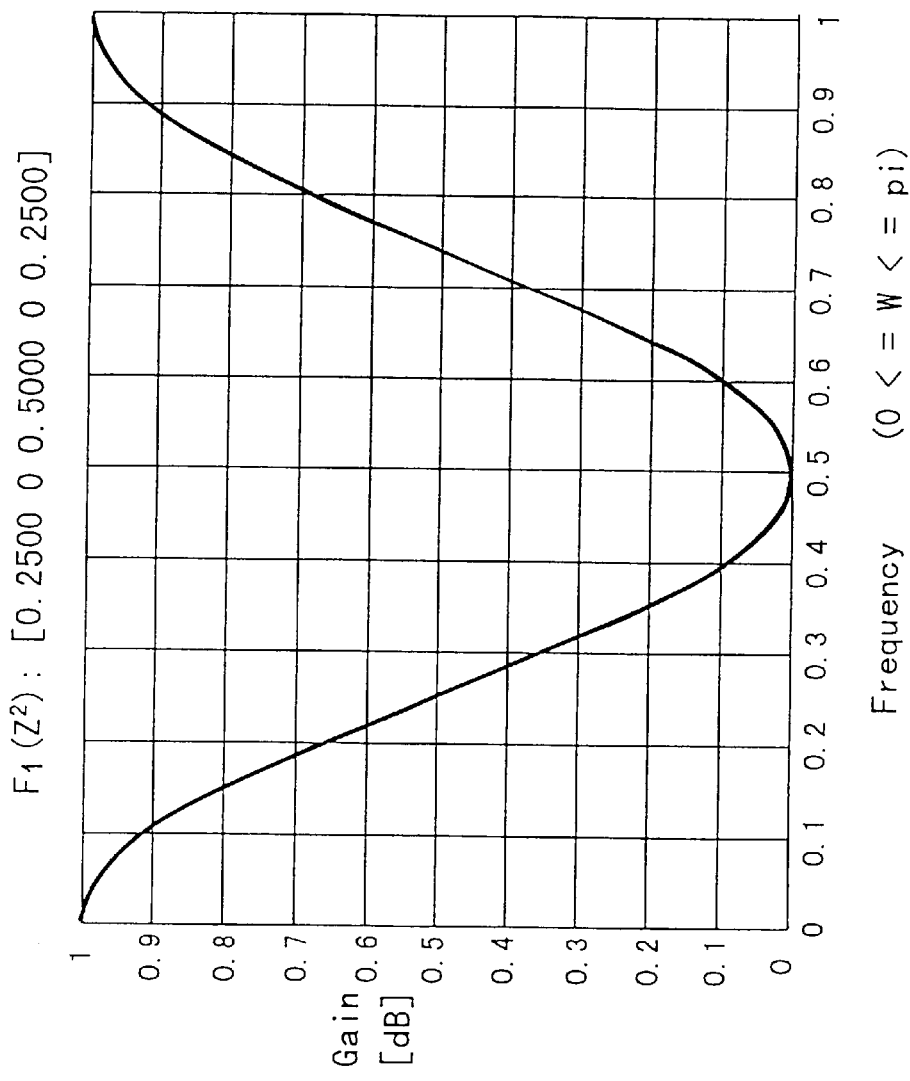
FIG. 27 is a graph showing a frequency characteristic of a low-pass filter $Fl(Z^2)$ of the band dividing filter according to the third embodiment.

FIG. 27 is a graph showing frequency characteristics of the LPF 235, which has the filter coefficients Fl($Z^2$), of the second band dividing filter 233. As shown in FIG. 27, when the frequency band ω1' of the filter Fl($Z^2$) is $0 \leq \omega1' \leq \pi/4$, a gain $G_{1'}$ is $0.5 \leq G_{1'} \leq 1$. Filter coefficients of the filter Fl($Z^2$) for the sampling points of $Z^{-2}$, $Z^{-1}$, 0, $Z^{+1}$, $Z^{+2}$ are 0.2500, 0, 0.5000, 0, 0.2500, respectively, which reveals that the filter Fl($Z^2$) has low-pass characteristic for the frequency band ω2' ($0 \leq \omega2' \leq \pi/2$) of the filter coefficients of the filter Fl(Z) of the first band dividing filter 230.

Figure 28:
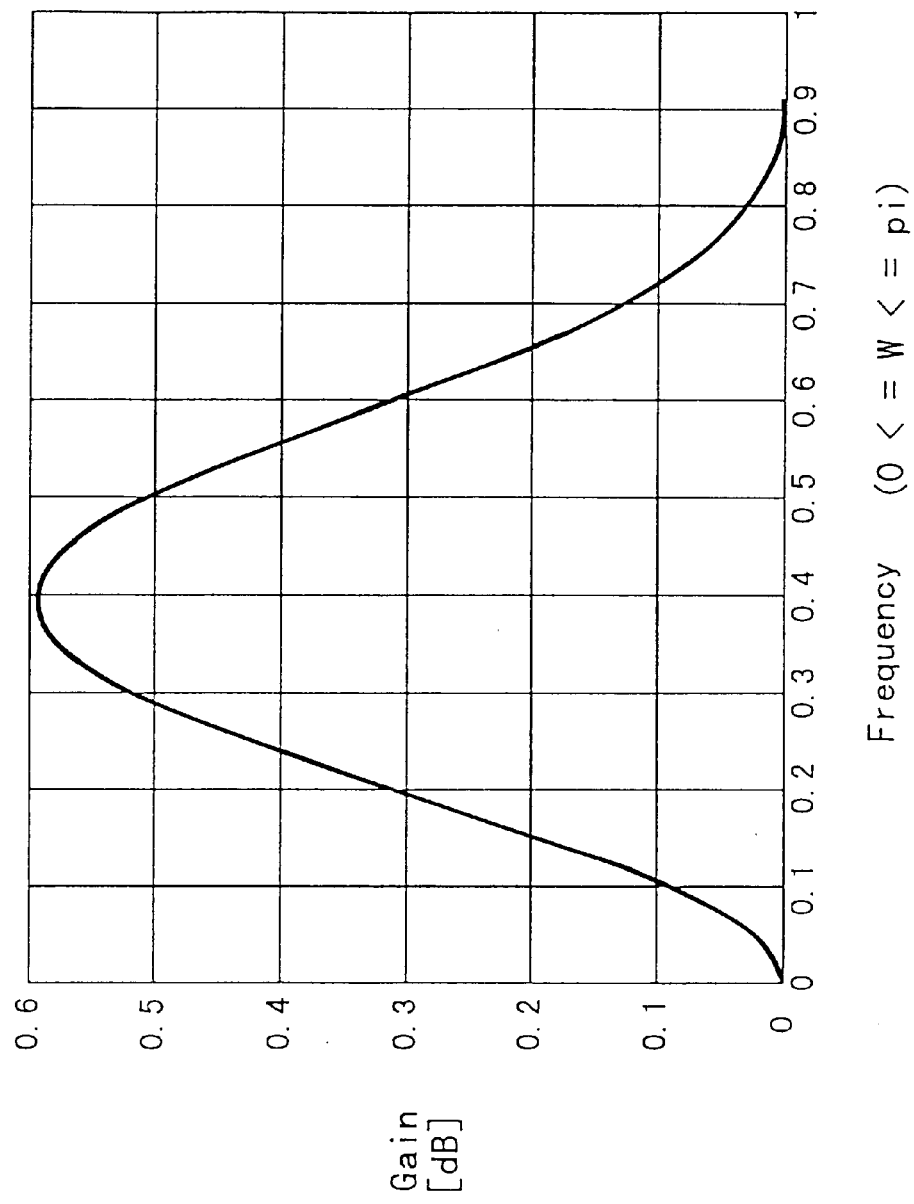
FIG. 28 is a graph showing a frequency characteristic of a filter $Fh(Z^2)Fl(Z)$ for passing data of a band 2 divided by the band dividing filter according to the third embodiment.

FIG. 28 is a graph showing frequency characteristics of a filter Fh($Z^2$)Fl(Z) which passes data of the band 2 and which is formed of the LPF 232, that has the filter coefficients Fl(Z), of the first band dividing filter 230 and the HPF 234, that has the filter coefficients Fh(Z2), of the second band dividing filter 233. As shown in FIG. 28, when the frequency band ω2 of the filter Fh($Z^2$)Fl(Z) is $\pi/4 \leq \omega2 \leq \pi/2$, a gain $G_2$ is $0.5 \leq G_2 \leq 0.6$. Filter coefficients of the filter Fh($Z^2$)Fl(Z) for the sampling points of $Z^{-3}$, $Z^{-2}$, $Z^{-1}$, 0, $Z^{+1}$, $Z^{+2}$, $Z^{+3}$ are −0.0625, −0.1250, 0.0625, 0.2500, 0.0625, −0.1250, −0.0625, respectively, which reveals that the filter Fh($Z^2$)Fl(Z) has middle-band-pass characteristic for the frequency band ω ($0 \leq \omega \leq \pi$) of input video data U(Z).

Figure 29:
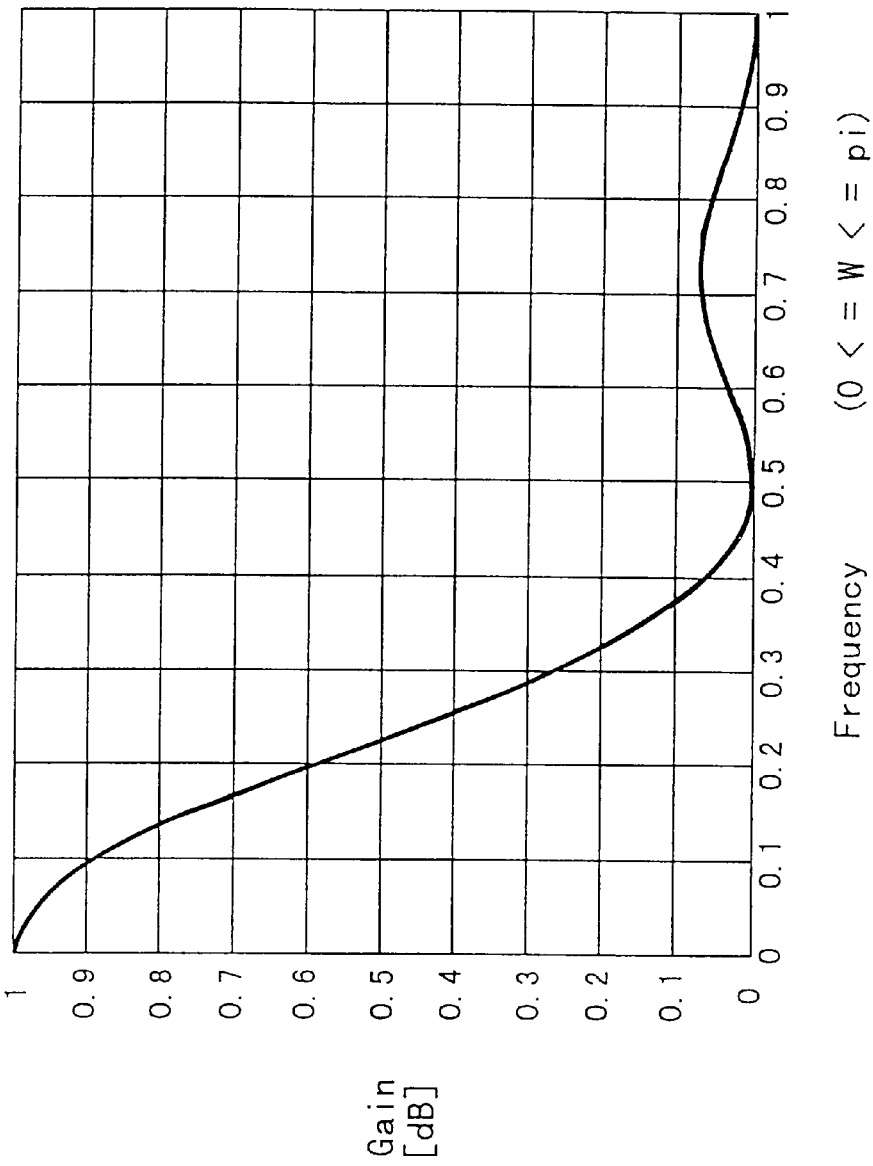
FIG. 29 is a graph showing a frequency characteristic of a filter $Fl(Z^2)Fl(Z)$ for passing data of a band 1 divided by the band dividing filter according to the third embodiment.

FIG. 29 is a graph showing frequency characteristics of a filter Fl(Z2)Fl(Z) which passes data of the band 1 and which is formed of the LPF 232, that has the filter coefficients Fl(Z), of the first band dividing filter 230 and the LPF 235, that has the filter coefficients Fl($Z^2$), of the second band dividing filter 233. As shown in FIG. 29, when the frequency band ω of the filter Fl($Z^2$)Fl(Z) is $0 \leq \omega1 \leq \pi/4$, a gain $G_1$ is $0.5 \leq G_1 \leq 1$. Filter coefficients of the filter Fl($Z^2$)Fl(Z) for the sampling points of $Z^{-3}$, $Z^{-2}$, $Z^{-1}$, 0, $Z^{+1}$, $Z^{+2}$, $Z^{+3}$ are 0.0625, 0.1250, 0.1875, 0.2500, 0.1875, 0.1250, 0.0625, respectively, which reveals that the filter Fl($Z^2$)Fl(Z) has a low-pass characteristic for the frequency band ω ($0 \leq \omega \leq \pi$) of input video data U(z).

Figure 30:
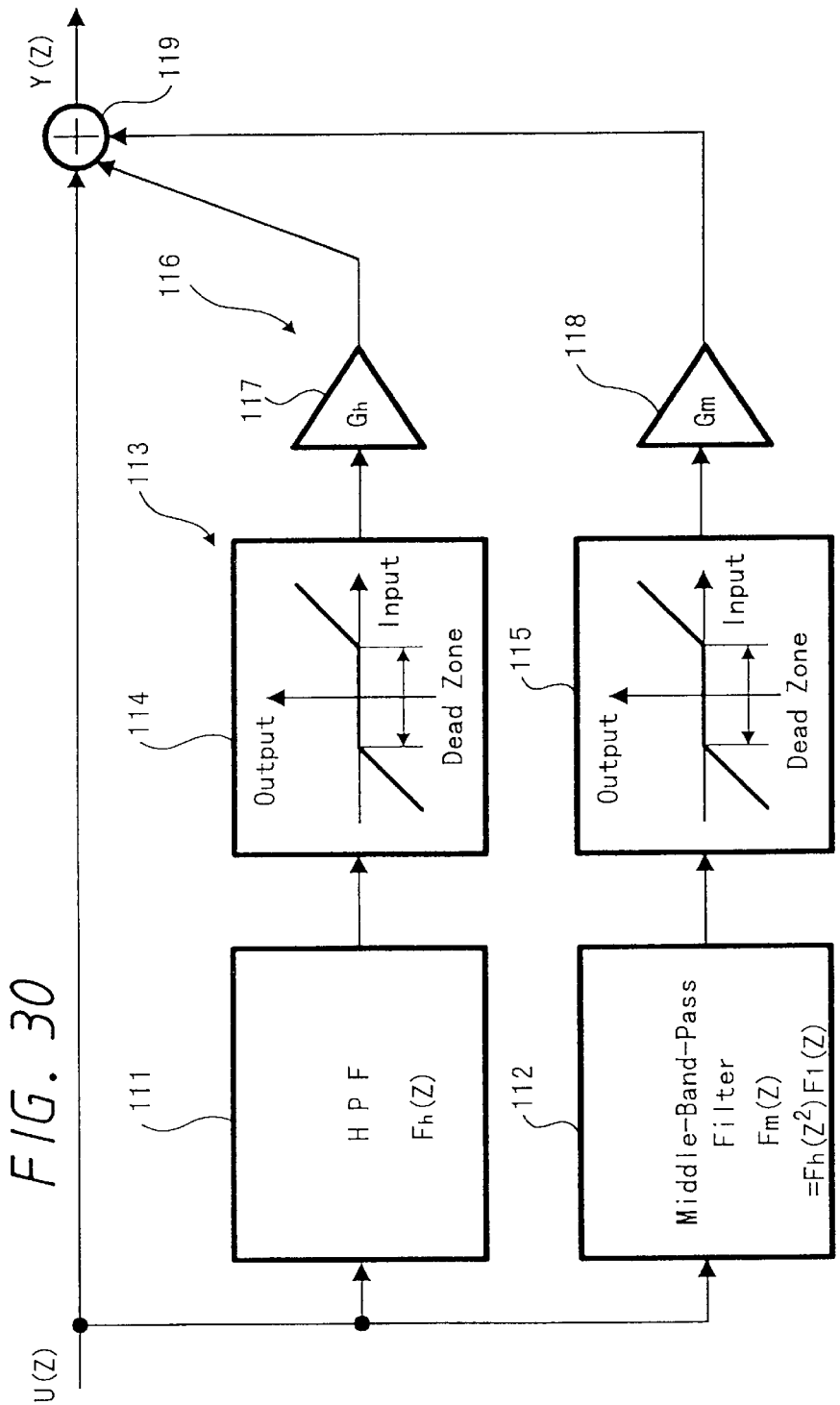
FIG. 30 is a block diagram showing an arrangement of a picture enhancement apparatus for two bands of the sharpness block as the picture enhancement apparatus according to the third embodiment.

FIG. 30 is a diagram showing an arrangement of a device for enhancing a picture in two bands of the sharpness block 22. An arrangement shown in FIG. 30 corresponds to the sharpness block 22 shown in FIG. 2. There will hereinafter be described a picture enhancement processing using a filter Fm(Z) =Fh($Z^2$)Fl(Z) for passing the band 2 obtained by dividing the frequency band by the band dividing filter shown in FIG. 22, and a filter Fh(Z) for passing data of the band 3.

As shown in FIG. 30, the device for enhancing the picture in two bands has a band dividing filter 110 for dividing the input video data U(Z) into data of high band and data of middle band, a noise cutting circuit 113 for cutting a noise by providing dead zones in the high and middle bands obtained by band division, an amplifier 116 for amplifying signals in the divided high and middle bands with independent gains, an adder circuit 119 for adding the input video data U(Z) with the data of high and middle bands amplified with the independent gains Gh, Gm to output the output video data Y(Z).

The band dividing filter 110 has a high-pass filter (HPF) 111 having filter coefficients Fh(z) and a middle-band-pass filter 112 having filter coefficients Fm(Z)=Fh($Z^2$)Fl(Z). The HPF 111 has the filer coefficients Fh(Z) of the first band dividing filter 230 shown in FIG. 22 and corresponds to the HPF 231 for outputting the band 3 video data Fh(Z)U(Z). The middle-band-pass filter 112 has the filter coefficients Fl(Z) of the LPF 232 of the first band dividing filter 230 and the filter coefficients Fh($Z^2$) of the HPF 234 of the second band dividing filter 233 and corresponds to the middle-band-pass filter for outputting the picture data in the band 2 Fm(Z)U(Z)=Fh($Z^2$)Fl(Z) U(Z).

The device for enhancing the picture in two bands thus arranged is operated as follow.

In a processing system for the band 3, the HPF 111 of the band dividing filter 110 passes the band 3 video data Fh(Z) U(Z) of the input video data U(Z). The noise cutting circuit 114 for the band 3 of the noise cutting circuit 113 cuts the noise of the band 3 video data Fh(Z)U(Z) in the range of a predetermined dead zone. This dead zone is set in the range of frequency to be enhanced. The band 3 video data Fh(Z) U(Z) from which the noise is removed is amplified by the amplifier 117 with the gain Gh for the band 3. The gain Gh is set large when a band in the band 3 is sharply enhanced, and set small when the band is made soft.

In a processing system for the band 2, the middle-band-pass filter 112 of the band dividing filter 110 passes the band 2 video data Fm(Z)U(Z)=Fh($Z^2$)Fl(Z)U(Z). The noise cutting circuit 115 for the band 2 of the noise cutting circuit 113 cuts the noise of the band 2 video data Fm(Z)U(Z)=Fh($Z^2$)Fl(Z)U(Z) in the range of a predetermined dead zone. This dead zone is set in the range of a frequency to be enhanced. The band 2 video data Fm(Z)U(Z)=Fh($Z^2$)Fl(Z)U(Z) from which the noise is removed is amplified by the amplifier 118 with the gain Gm for the band 2. The gain Gm is set large when a band in the band 2 is sharply enhanced, and set small when the band is made soft.

As described above, the band 3 video data and the band 2 video data respectively amplified with the gains Gh and Gm are supplied to the adder circuit 119 together with the input video data U(Z), and then the adder circuit 119 adds them and outputs the output video data Y(Z).

Figure 31:
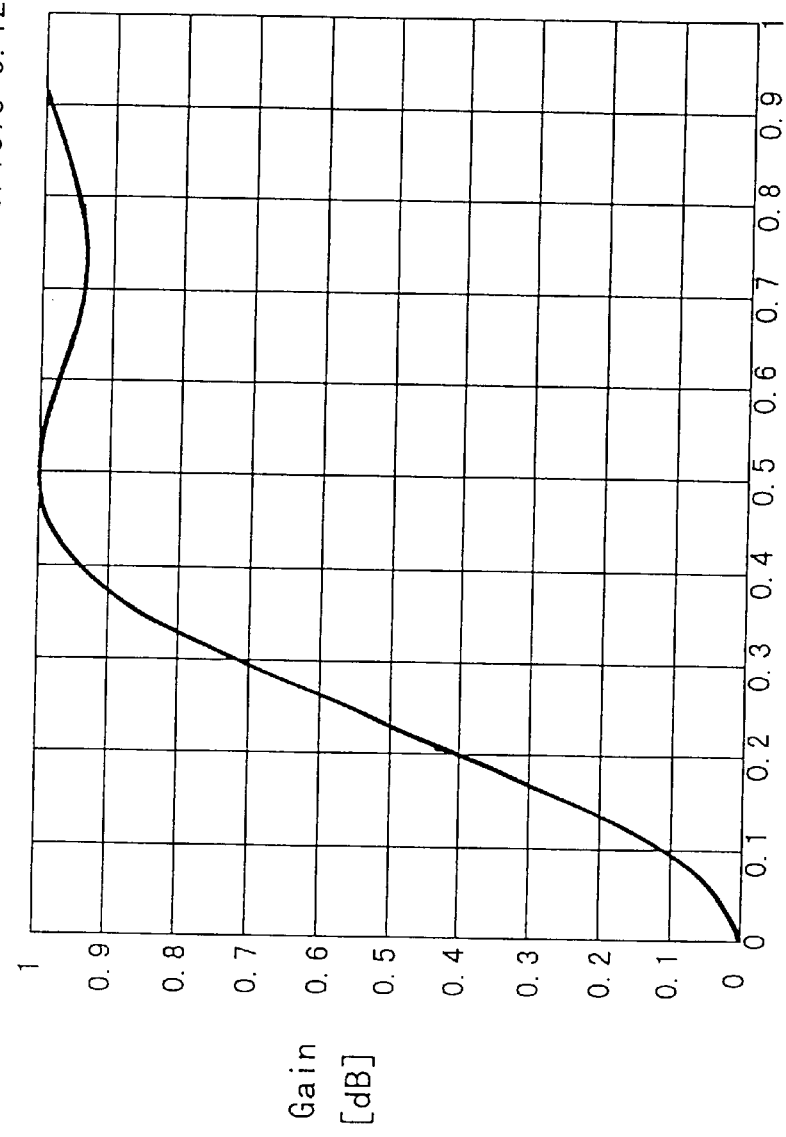
FIG. 31 is a graph showing a frequency characteristic of a filter Fh(Z)=Fm(Z) for passing data of a band 3 according to the picture enhancement apparatus for two bands according to the third embodiment.

FIG. 31 is a graph showing a frequency characteristic of a filter having filter coefficients (=Fm(Z)+Fh(Z)) obtained by addition of the filter coefficients Fh(Z) for the band 3 and the filter coefficients Fm(Z). FIG. 31 shows the frequency characteristics of the filter having the filter coefficients (=Fm(Z)+Fh(Z)) obtained by addition of the filter coefficients Fh(Z) for the band 3 of the HPF 111 of the band dividing filter 110 and the filter coefficients Fm(Z) of the middle-band-pass filter 112 thereof. In FIG. 31, a frequency band whm of the filter having filter coefficients (=Fm(Z)+Fh(Z)) obtained by addition of the filter coefficients Fh(Z) for the band 3 and the filter coefficients Fm(Z) is $\pi/4 \leq \omega hm \leq \pi$, a gain Ghm is $0.5 \leq Ghm \leq \pi$. The filter coefficients Fh(Z)+Hm(Z) for the sampling points $Z^{-3}$, $Z^{-2}$, $Z^{-1}$, 0, $Z^{+1}$, $Z^{+2}$, $Z^{+3}$ are −0.0625, −0.1250, 0.1875, 0.7500, −0.1875, −0.1250, −0.0625, respectively, which reveals that the filter Fm(Z)+Fh(Z) has a high-pass characteristic. The filter coefficients are all multiples of 2, which simplifies a circuit scale.

Since the gains Gh, Gm are independently set for the two filters of the band dividing filter 111, it is possible to change the enhancement characteristics freely as carried out by a simple equalizer. The frequency characteristics shown in FIG. 31 are those obtained when the gains Gh, Gm are values of 1. In this case, the filter Fh(Z))+Fm(Z) is a high-pass filter for passing the band which is the middle band or higher.

As described above, according to the third embodiment, it is possible to effect the effective enhancement on the picture of the low frequency band and the interpolated picture.

The present invention is not limited thereto, and the picture enhancement apparatus having filters for three bands or larger can be easily formed by increasing the number of stages of the band dividing filters.

If the above method is realized similarly by a two-dimensional filter, then the picture enhancement method can be improved to a two-dimensional picture enhancement system for two band or larger. In this case, the filter coefficients Fh(Z), Fl(Z) are expressed by the following equations (10), (11), respectively.

$$Fh(Z) + \begin{pmatrix} -1/16, & -1/16, & -1/16 \\ -1/16, & 1/2 & -1/16 \\ -1/16, & -1/16, & -1/16 \end{pmatrix} \quad (10)$$

$$Fl(Z) + \begin{pmatrix} 1/16, & 1/16, & 1/16 \\ 1/16, & 1/2 & 1/16 \\ 1/16, & 1/16, & 1/16 \end{pmatrix} \quad (11)$$

The present invention is not limited to the above first embodiment and can be applied to an operation of printing a low-resolution image by a digital color printer with high resolution and a software for making a resolution of the image higher by a computer.

As described above, according to the third embodiment, it is possible to effect the enhancement with high picture quality with the enhancement characteristics freely chanted as carried out by a simple equalizer. Moreover, it si possible to effect the effective enhancement on the picture of the low frequency characteristic and the interpolated picture.

Having described preferred embodiments of the picture present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A video processing apparatus, comprising:
   edge detecting means for detecting an edge direction of an image;
   coefficient selecting means for selecting a coefficient based on the edge direction detected by said edge detecting means; and
   filter means for filtering a frequency band by using a frequency characteristic corresponding to the coefficient selected by said coefficient selecting means, wherein the number of pixels of said image is enlarged twice.

2. A video processing apparatus according to claim 1, wherein said edge detecting means comprises maximum inclination direction detecting means for detecting a maximum local inclination direction of said image, vertical direction detecting means for detecting as the edge direction a vertical direction perpendicular to said maximum inclination direction detected by said maximum inclination detecting means, and edge direction area designating means for dividing the edge direction detected by said vertical direction detecting means into a plurality of areas to designate an area to which said edge direction belongs.

3. A video processing apparatus according to claim 1, wherein said filter means is a two-dimensional digital filter and has edge-direction-corresponding-coefficient selecting means for selecting a coefficient corresponding to the edge direction detected by said edge detecting means, from a plurality of predetermined coefficients having frequency characteristics having directivity.

4. A video processing apparatus according to claim 1, wherein said edge detecting means comprises maximum inclination direction detecting means for detecting a maximum local inclination direction of said image, vertical direction detecting means for detecting as the edge direction a vertical direction perpendicular to said maximum inclination direction detected by said maximum inclination detecting means, edge direction area designating means for dividing the edge direction detected by said vertical direction detecting means into a plurality of areas to designate an area to which said edge direction belongs, and right-angle corner pattern detecting means for selecting a horizontal direction as the edge direction of the area designated by said edge direction area designating means when the edge direction area designating means detects that the edge direction is the diagonal direction and a pixel to be interpolated is located in a right-angle portion of the image.

5. A video processing method, comprising the steps of:
   detecting a local edge direction of an image;
   filtering a predetermined frequency band with a predetermined gain by using a frequency characteristic of a coefficient selected in response to said detected edge direction; and
   enlarging the number of specific pixels of said image twice in one direction.

6. A video processing method according to claim 5, wherein said edge detecting step comprises a step of detecting a maximum local inclination direction of said image, a step of detecting as the edge direction a vertical direction perpendicular to said detected maximum local inclination direction, and a step of dividing said detected edge direction into a plurality of areas to designate an area to which said edge direction belongs.

7. A video processing method according to claim 5, wherein said filtering step is carried out by a two-dimensional digital filter and a coefficient corresponding to the edge direction detected in said edge detecting step is selected from a plurality of predetermined coefficients having frequency characteristics having directivity.

8. A video processing method according to claim 5, wherein said edge detecting step comprises a step of detecting a maximum local inclination direction of said image, a step of detecting as the edge direction a vertical direction perpendicular to said detected maximum local inclination direction, a step of dividing said detected edge direction into a plurality of areas to designate an area to which said edge direction belongs, and a step of selecting a horizontal direction as the edge direction when it is detected that the edge direction is the diagonal direction and a pixel to be interpolated is located in a right-angle portion of the image.

9. A video printer for subjecting video data of an image to a predetermined interpolation processing to carry out printing by a print head by using the interpolated video data, comprising:
   edge detecting means for detecting a local edge direction of an image;
   filter means for selecting a coefficient in response to the edge direction detected by the edge detecting means to filter a predetermined frequency band with a predetermined gain by using a frequency characteristic of said selected coefficient.

* * * * *